US012628220B2

(12) United States Patent
Kim et al.

(10) Patent No.: US 12,628,220 B2
(45) Date of Patent: May 12, 2026

(54) METHOD AND APPARATUS FOR COOPERATIVE COMMUNICATION USING MULTI-LINK IN COMMUNICATION SYSTEM

(71) Applicants: HYUNDAI MOTOR COMPANY, Seoul (KR); KIA CORPORATION, Seoul (KR); KOREA NATIONAL UNIVERSITY OF TRANSPORTATION INDUSTRY-ACADEMIC COOPERATION FOUNDATION, Chungju-si (KR)

(72) Inventors: Yong Ho Kim, Incheon (KR); Han Seul Hong, Seoul (KR)

(73) Assignees: HYUNDAI MOTOR COMPANY, Seoul (KR); KIA CORPORATION, Seoul (KR); KOREA NATIONAL UNIVERSITY OF TRANSPORTATION INDUSTRY-ACADEMIC COOPERATION FOUNDATION, Chungju-si (KR)

( * ) Notice: Subject to any disclaimer, the term of this patent is extended or adjusted under 35 U.S.C. 154(b) by 939 days.

(21) Appl. No.: 17/773,462

(22) PCT Filed: Oct. 23, 2020

(86) PCT No.: PCT/KR2020/014573
§ 371 (c)(1),
(2) Date: Apr. 29, 2022

(87) PCT Pub. No.: WO2021/085948
PCT Pub. Date: May 6, 2021

(65) Prior Publication Data
US 2022/0408506 A1 Dec. 22, 2022

(30) Foreign Application Priority Data

Oct. 31, 2019 (KR) ........................ 10-2019-0138101
Nov. 1, 2019 (KR) ........................ 10-2019-0138816
Oct. 8, 2020 (KR) ........................ 10-2020-0130531

(51) Int. Cl.
H04W 76/15 (2018.01)
H04W 4/40 (2018.01)
H04W 84/12 (2009.01)

(52) U.S. Cl.
CPC ............. *H04W 76/15* (2018.02); *H04W 4/40* (2018.02); *H04W 84/12* (2013.01)

(58) Field of Classification Search
None
See application file for complete search history.

(56) References Cited

U.S. PATENT DOCUMENTS 8,588,115 B2 11/2013 Gao et al.
9,807,677 B2 10/2017 Kim et al.
(Continued)

FOREIGN PATENT DOCUMENTS

KR 20080083296 A 9/2008
KR 20110091487 A 8/2011
(Continued)

OTHER PUBLICATIONS

International Search Report and Written Opinion cited in corresponding international app No. PCT/KR2020/014573; Mar. 31, 2021; 13 pp.

*Primary Examiner* — Steve R Young
(74) *Attorney, Agent, or Firm* — Lempia Summerfield Katz LLC

(57) ABSTRACT

Disclosed are a method and apparatus for cooperative communication using a multi-link in a communication system. An operating method of a first device comprises the steps of:
(Continued)

| element ID | length | element ID extension | operating class | channel number | broadcast | channel switch time | SSW needed (optional) | direction information (optional) |
|---|---|---|---|---|---|---|---|---|

| AOA azimuth angle (recommended azimuth angle) | AOA elevation angle (recommended elevation angle) | azimuth accuracy | elevation accuracy |
|---|---|---|---|
| bits : 11 | 10 | 7 | 7 | generating a first request frame including an information element indicating a link switch time point; transmitting, to a second device, the first request frame via a first link; and receiving, from the second device via the first link, a first response frame indicating that the information element included in the first request frame has been identified.

12 Claims, 27 Drawing Sheets

(56)                References Cited

U.S. PATENT DOCUMENTS

| | | | | |
|---|---|---|---|---|
| 10,959,153 | B2 | 3/2021 | Patil et al. | |
| 11,246,057 | B2 | 2/2022 | Hyun et al. | |
| 2006/0268756 | A1* | 11/2006 | Wang | H04W 36/324 |
| | | | | 370/310 |
| 2007/0253353 | A1* | 11/2007 | Korus | H04W 8/26 |
| | | | | 370/328 |
| 2009/0067354 | A1 | 3/2009 | Gao et al. | |
| 2015/0334638 | A1 | 11/2015 | Kim et al. | |
| 2017/0310610 | A1 | 10/2017 | Qi | |
| 2019/0082373 | A1* | 3/2019 | Patil | H04L 1/1614 |
| 2019/0268817 | A1* | 8/2019 | Seo | H04W 84/04 |
| 2020/0322841 | A1 | 10/2020 | Hyun et al. | |
| 2021/0051574 | A1* | 2/2021 | Chu | H04W 84/18 |
| 2022/0225236 | A1* | 7/2022 | Bang | H04W 52/0248 |

FOREIGN PATENT DOCUMENTS

| | | | |
|---|---|---|---|
| KR | 20140009929 | A | 1/2014 |
| KR | 20170133165 | A | 12/2017 |
| WO | 2009064105 | A2 | 5/2009 |
| WO | 2010134737 | A2 | 11/2010 |
| WO | 2014098437 | A1 | 6/2014 |
| WO | 2019050704 | A1 | 3/2019 |

* cited by examiner

: operation/frame/information of the first link

: operation/frame/information of the second link

: operation/frame/information of the first link         ⟹ : first link

: operation/frame/information of the second link     ⟹ : second link

: operation/frame/information of the first link     : first link

: operation/frame/information of the second link     : second link

FIG. 23

| type-1 PCP handover frame | element ID | length | previous BSSID | address of next control MLD | TSF offset |
|---|---|---|---|---|---|
| octets : | 1 | 1 | 6 | 6 | 1 |

| type-2 PCP handover frame | element ID | length | TSF offset | address of next control MLD | reserved |
|---|---|---|---|---|---|
| octets : | 1 | 1 | 6 | 6 | 1 |

METHOD AND APPARATUS FOR COOPERATIVE COMMUNICATION USING MULTI-LINK IN COMMUNICATION SYSTEM

CROSS-REFERENCE TO RELATED APPLICATIONS

This application is a U.S. national stage of International Application No. PCT/KR2020/014573, filed on Oct. 23, 2020, which claims priority to Korean Patent Application No. 10-2019-0138101, filed on Oct. 31, 2019. Korean Patent Application No. 10-2019-0138816, filed on Nov. 1, 2019, and Korean Patent Application No. 10-2020-0130531, filed on Oct. 8, 2020, the entire contents of which are incorporated herein by reference.

TECHNICAL FIELD

The present disclosure relates to a wireless local area network (LAN) communication technique, and more particularly, to a communication technique using a multi-link having different bands in a wireless LAN system.

BACKGROUND ART

Recently, as the distribution of mobile devices has been expanded, a wireless LAN technology capable of providing fast wireless communication services to mobile devices has been in the spotlight. The standards using the wireless LAN technology are mainly being developed as Institute of Electrical and Electronics Engineers (IEEE) 802.11 standards by the IEEE. An early version of the IEEE 802.11 standard can support a communication speed of 1 to 2 megabits per second (Mbps), and subsequent versions of the IEEE 802.11 standards are being standardized in a direction of improving the communication speed.

In addition, the IEEE 802.11 standards define fast handoff technologies (e.g., fast basic service set (BSS) transition), fast initial link setup technologies, technologies for stations (e.g., low-power stations) operating in a band below 1 gigahertz (i.e., sub-GHz band), vehicle communication technologies, and the like. An STAtion may directly communicate with another station without performing an authentication procedure and an association procedure with an access point. In other words, the station may support 'outside context of BSS (OCB)' communications.

The vehicle communication technologies were reflected in the IEEE 802.11p standard. The IEEE 802.11p standard can support a signal form defined in the IEEE 802.11a Standard and an Enhanced Distributed Channel Access (EDCA) defined in the IEEE 802.11e standard. Communications according to the IEEE 802.11p standard may operate in a 5.9 GHz band. A basic bandwidth of the IEEE 802.11p standard may be configured to support communications of a mobile station (e.g., station moving at a high speed). For example, the basic bandwidth of the IEEE 802.11p standard may be 10 megahertz (MHz).

Various sensors and operations are being developed for vehicle communications, and various applications for the corresponding operations are being developed. In order to improve a data throughput and/or transmission distance compared to the IEEE 802.11p standard, standardization of next-generation vehicle-to-everything (NGV) technologies is in progress in the IEEE 802.11bd. In addition, since recent applications require a high data throughput and/or real-time transmission, extreme high throughput (EHT) wireless LAN technologies are being developed to support the same.

DISCLOSURE

Technical Problem

The present disclosure is directed to providing a method and an apparatus for communications using a multi-link supporting different bands in a wireless LAN system.

Technical Solution

An operation method of a first device according to a first embodiment of the present disclosure may comprise: generating a first request frame including an information element indicating a link switch time; transmitting, to a second device, the first request frame through the first link; and receiving, from the second device, a first response frame indicating that the information element included in the first request frame is confirmed through the first link. The link switch time indicates a time at which an operating link is switched from the first link to the second link. One or more stations (STAs) are affiliated with each of the first device and the second device. Each of the one or more STAs is an access point (AP) STA or a non-AP STA.

The operation method may further comprise: performing a procedure of confirming a link switch with the second device in the second link; and performing communication with the second device by using the second link when the operating link is confirmed to be switched from the first link to the second link.

The procedure of confirming the link switch may comprise: transmitting, to the second device, a second request frame requesting confirmation of the link switch through the second link; and receiving, from the second device, a second response frame indicating that the link switch is completed through the second link.

The operation method may further comprise: performing a procedure of confirming a link switch with the second device in the second link; and performing communication with the second device by using the first link when the operating link is confirmed not to be switched from the first link to the second link.

The first request frame or the first response frame may further include an information element indicating a return time. When the operating link is not switched from the first link to the second link within a preset period, communication using the first link instead of the second link may be performed after the return time.

The operation method may further comprise: performing a channel measurement operation with the second device in the second link; and performing communication with the second device by using the second link when the channel measurement operation is completed. Frames for the channel measurement operation are transmitted in a sweeping scheme.

The first request frame may include at least one of an information element indicating a type of the first device transmitting the first request frame, an information element indicating a type of the second device transmitting the first response frame, an information element indicating a type of data transmitted in the second link, an information element indicating a transmission direction in the second link, or a combination thereof.

An operation method of a first device according to a second embodiment of the present disclosure may comprise:

generating a second frame including system information for a communication operation in the second link; transmitting, to a second device, the second frame through the first link; and after transmitting the second frame, performing the communication operation with the second device in the second link by using the system information included in the second frame.

The operation method may further comprise: receiving, from the second device, a first frame including a capability information element of the second device through the first link. The second frame is a response frame for the first frame.

The first frame may further include an information element indicative of supporting the communication operation in the second link.

The first frame may be a probe request frame, an action frame, or a management frame.

The system information may include an information element indicating a target beacon transmission time (TBTT) in the second link.

The system information may be system information of one or more STAs included in the first device, and each of the one or more STAs may be an access point (AP) STA or a non-AP STA.

The second frame may be a probe response frame or a beacon frame.

An operation method of a first candidate device according to a third embodiment of the present disclosure may comprise: receiving, from a control device controlling a communication operation, a first message including information of one or more candidate devices that are to control the communication operation after the control device; performing a channel measurement operation with the control device, and when a preset event occurs, controlling the communication operation instead of the control device. The first candidate device belongs to the one or more candidate devices indicated by the first message. Each of the first candidate device and the control device is affiliated with one or more stations (STAs. Each of the one or more STAs is an access point (AP) STA or a non-AP STA.

The first message may be periodically transmitted from the control device, and the preset event may be an event when the first message is not received from the control device in a reception period of the first message.

The preset event may be an event when a second frame requesting a change of a device controlling the communication operation is received from the control device.

The second frame may include at least one of an information element indicating an address of the first candidate device or an information element indicating a time at which the first candidate device controls the communication operation.

The information of the one or more candidate devices included in the first frame may be compressed addresses thereof, and an order of the compressed addresses in the first frame may be an order of candidate devices that are to control the communication operation.

The operation method may further comprise: transmitting a third message including information of remaining candidate device(s) other than the first candidate device among the one or more candidate devices. The remaining candidate device(s) indicated by the third message may be candidate device(s) that are to control the communication operation after the first candidate device.

Advantageous Effects

According to the present disclosure, by performing a negotiation procedure for a communication operation using another link (e.g., second link) in an existing link (e.g., first link), a use time (e.g., link switch time) of the another link and a communication node (e.g., multi-link device (MLD)) using the another link may be determined. In addition, a communication node (e.g., control MLD) that controls the communication operation in the another link may be determined. A procedure for changing the control MLD may be performed and accordingly the communication operation may be performed by the changed control MLD. Accordingly, the performance of the wireless LAN system can be improved.

DESCRIPTION OF DRAWINGS

FIG. 23 is a conceptual diagram illustrating a first embodiment of a PCP handover frame in a wireless LAN system.

DETAILED DESCRIPTION

Figure 1:
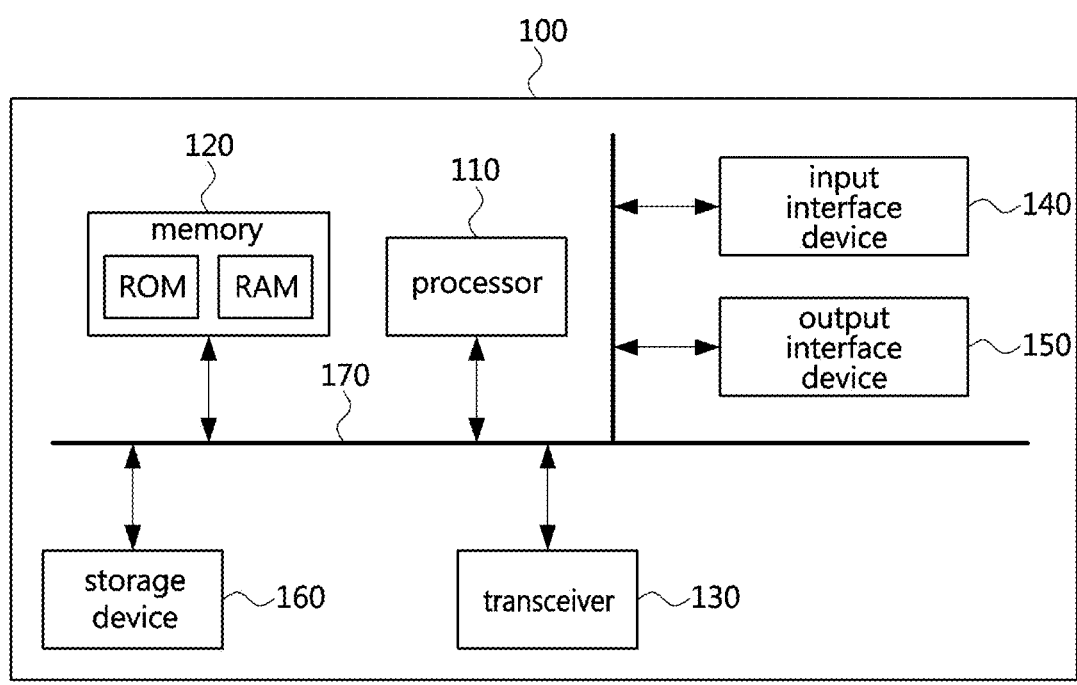
FIG. 1 is a block diagram illustrating a first embodiment of a communication node constituting a wireless local area network (LAN) system.

Since the present disclosure may be variously modified and have several forms, specific embodiments are shown in the accompanying drawings and are described in detail in the detailed description. It should be understood, however, that it is not intended to limit the present disclosure to the specific embodiments. On the contrary, the present disclosure is intended to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it should be understood that a further component is not disposed therebetween.

The terms used in the present disclosure are only used to describe specific embodiments and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure are described in detail with reference to the accompanying drawings. In describing the disclosure, to facilitate the entire understanding of the disclosure, like numbers refer to like elements throughout the description of the figures and the repetitive description thereof has been omitted.

In the following, a wireless communication system to which embodiments according to the present disclosure are applied is described. The wireless communication system to which the embodiments according to the present disclosure are applied is not limited to the content described below, and the embodiments according to the present disclosure may be applied to various wireless communication systems. The wireless communication system may be referred to as 'wireless communication network'.

FIG. 1 is a block diagram illustrating a first embodiment of a communication node constituting a wireless LAN system.

As shown in FIG. 1, a communication node 100 may be an access point or a station. An access point may be referred to as 'AP', and a station may be referred to as 'STA' or 'non-AP STA'. An operating channel width supported by the AP may be 20 MHz, 80 MHz, 160 MHz, or the like. The operating channel width supported by the STA may be 20 MHz, 80 MHz, or the like.

The communication node 100 may include at least one processor 110, a memory 120, and a transceiver 130 connected to a network for performing communications. The transceiver 130 may also be referred to as a radio frequency (RF) unit, an RF module, or the like. Additionally, the communication node 100 may further include an input interface device 140, an output interface device 150, a storage device 160, and the like. The respective components included in the communication node 100 may be configured to communicate with each other as connected via a common bus 170.

However, each of the components included in the communication node 100 may be connected to the processor 110 via a separate interface or a separate bus rather than the common bus 170. For example, the processor 110 may be connected to at least one of the memory 120, the transceiver 130, the input interface device 140, the output interface device 150, or the storage device 160 via a dedicated interface.

The processor 110 may be configured to execute at least one program command stored in at least one of the memory 120 or the storage device 160. The processor 110 may refer to a central processing unit (CPU), a graphics processing unit (GPU), or a dedicated processor. Methods in accordance with embodiments of the present disclosure may be performed by the processor 110. Each of the memory 120 and the storage device 160 may include at least one of a volatile storage medium or a non-volatile storage medium. For example, the memory 120 may include at least one of read-only memory (ROM) or random access memory (RAM).

Meanwhile, in the wireless LAN system, an access procedure may be performed as follows.

Figure 2:
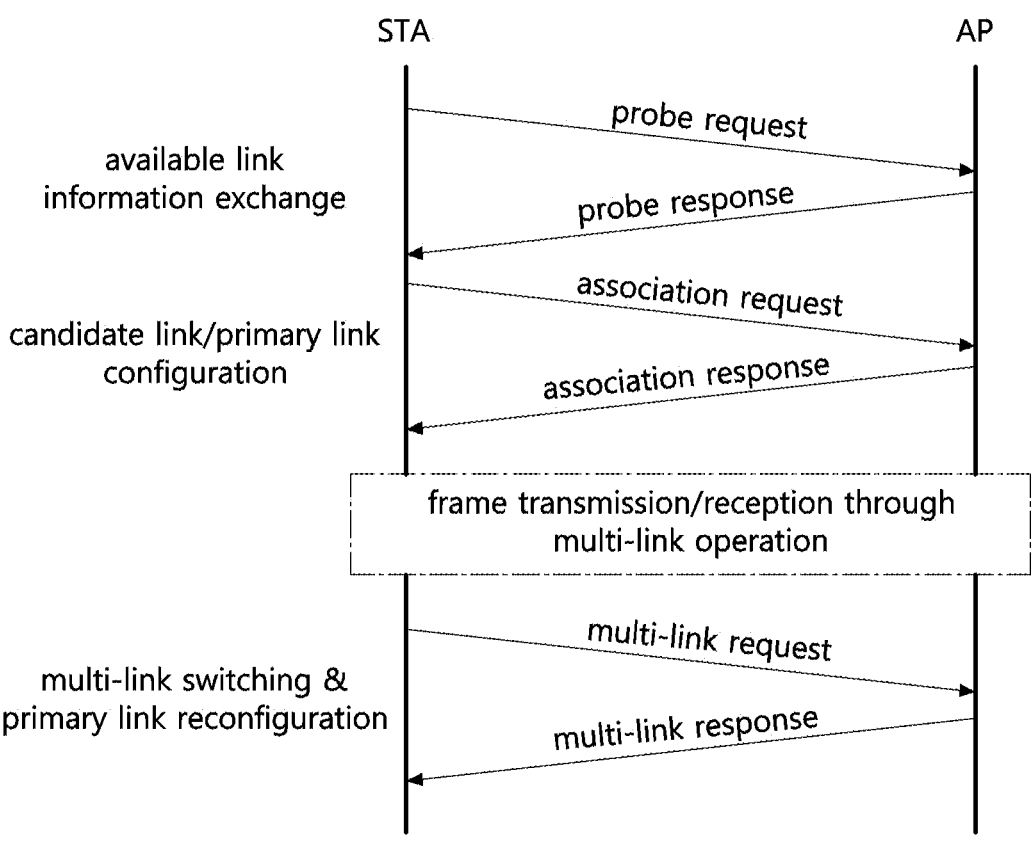
FIG. 2 is a sequence chart illustrating a first embodiment of an access procedure in a wireless LAN system.

FIG. 2 is a sequence chart illustrating a first embodiment of an access procedure in a wireless LAN system.

As shown in FIG. 2, an access procedure between an STA and an AP in an infrastructure BSS may generally be divided into a probe step of probing AP(s), an authentication step for authentication between the STA and the probed AP, and an association step of association between the STA and the authenticated AP.

In the probe step, the STA may detect one or more APs using a passive scanning scheme or an active scanning scheme. When the passive scanning scheme is used, the STA may detect one or more APs by overhearing beacon frames transmitted by the one or more APs. When the active scanning scheme is used, the STA may transmit a probe request frame and may detect one or more APs by receiving probe response frames that are responses to the probe request frame from the one or more APs.

When the one or more APs are detected, the STA may perform an authentication step with the detected AP(s). In this case, the STA may perform the authentication step with a plurality of APs. An authentication algorithm according to the IEEE 802.11 standard may be classified into an open system algorithm of exchanging two authentication frames, a shared key algorithm of exchanging four authentication frames, and the like.

The STA may transmit an authentication request frame based on the authentication algorithm according to the IEEE 802.11 standard and may complete authentication with the AP by receiving an authentication response frame that is a response to the authentication request frame from the AP.

When the authentication with the AP is completed, the STA may perform an association step with the AP. In particular, the STA may select one AP among AP(s) with which the STA has performed the authentication step and may perform the association step with the selected AP. In other words, the STA may transmit an association request frame to the selected AP and may complete the association with the AP by receiving an association response frame that is a response to the association request frame from the selected AP.

Meanwhile, a multi-link operation may be supported in the wireless LAN system. A multi-link device (MLD) may include one or more STAs affiliated with the MLD. The MLD may be a logical entity. The MLD may be classified into an AP MLD and a non-AP MLD. Each STA affiliated with the AP MLD may be an AP, and each STA affiliated with the non-AP MLD may be a non-AP STA. In order to configure a multi-link, a multi-link discovery procedure, a multi-link setup procedure, and the like may be performed. The multi-link discovery procedure may be performed in the probe step between an STA and an AP. In this case, multi-link information elements (ML IEs) may be included in the beacon frame, the probe request frame, and/or the probe response frame.

For example, in order to perform a multi-link operation, in the probe step, the AP (e.g., AP affiliated with an MLD) may exchange information indicating whether the multi-link operation can be used and exchange information on available link(s) with the STA (e.g., non-AP STA affiliated with an MLD). In a negotiation procedure for the multi-link operation (e.g., multi-link setup procedure), the STA may transmit information of link(s) to be used for the multi-link operation. The negotiation procedure for the multi-link operation may be performed in the access procedure (e.g., association step) between the STA and the AP, and information element(s) required for the multi-link operation may be configured or changed by an action frame in the negotiation procedure.

In addition, in the access procedure (e.g., association step) between the STA and the AP, available link(s) of the AP may be configured, and an identifier (ID) may be assigned to each link. Thereafter, in the negotiation procedure and/or change procedure for the multi-link operation, information indicating whether each link is activated may be transmitted, and the information may be expressed using the link ID(s).

The information indicating whether the multi-link operation can be used may be transmitted and received in a procedure of exchanging capability information element(s) (e.g., EHT capability information element(s)) between the STA and the AP. The capability information element(s) may include information of supporting band(s), information of supporting link(s) (e.g., ID(s) and/or number of supporting link(s)), information of links capable of simultaneous transmission and reception (STR) operations (e.g., information on bands of the links, information on a separation between the links), and/or the like. In addition, the capability information element(s) may include information that individually indicates a link capable of the STR operation.

Figure 3:
FIG. 3 is a conceptual diagram illustrating a first embodiment of a multi-link configured between multi-link devices (MLDs).

FIG. 3 is a conceptual diagram illustrating a first embodiment of a multi-link configured between MLDs.

As shown in FIG. 3, an MLD may have one medium access control (MAC) address. The MAC addresses of MLDs may be used in a multi-link setup procedure between a non-AP MLD and an AP MLD. The MAC address of the AP MLD may be different from the MAC address of the non-AP MLD. APs affiliated with the AP MLD may have different MAC addresses, and STAs affiliated with the non-AP MLD may have different MAC addresses. The MLD may support an STR operation. In this case, the MLD may perform a transmission operation in a first link and may perform a reception operation in a second link. The MLD supporting the STR operation may be referred to as 'STR MLD (e.g., STR AP MLD or STR non-AP MLD).

The MLD may transmit and receive frames in a multi-link by using a non-contiguous bandwidth extension scheme (e.g., 80 MHz+80 MHz). The AP MLD may include a plurality of APs, and the plurality of APs may operate in different links. The non-AP MLD may include a plurality of STAs, and the plurality of STAs may operate in different links.

The MLD may perform communications in a multi-band. For example, the MLD may perform communications using a 40 MHz bandwidth according to a channel extension scheme (e.g., bandwidth extension scheme) in a 2.4 GHz band and may perform communications using a 160 MHz bandwidth according to a channel extension scheme in a 5 GHz band. The MLD may perform communications using a 160 MHz bandwidth in the 5 GHz band and may perform communications using a 160 MHz bandwidth in a 6 GHz band. One frequency band (e.g., one channel) used by the MLD may be defined as one link. Alternatively, a plurality of links may be configured in one frequency band used by the MLD. For example, the MLD may configure one link in the 2.4 GHz band and two links in the 6 GHz band.

The MLD (e.g., AP MLD and non-AP MLD) may configure a multi-link by performing an access procedure and/or a negotiation procedure for multi-link operation. In this case, the number of links and/or link(s) to be used among the multiple links may be configured. The non-AP MLD may identify information on band(s) capable of communicating with the AP MLD. In the negotiation procedure for a multi-link operation between the non-AP MLD and the AP MLD, the non-AP MLD may configure one or more links among links supported by the AP MLD to be used for the multi-link operation. An STA (e.g., IEEE 802.11a/b/g/n/ac/ax STA) that does not support the multi-link operation may be connected to one or more links among the links supported by the AP MLD.

When a band separation between the multi-links (e.g., a band separation between the first link and the second link in the frequency domain) is sufficient, the MLD may perform an STR operation. For example, the MLD may transmit a physical layer convergence procedure (PLCP) protocol data unit (PPDU) by using the first link among the multi-links and may receive a PPDU by using the second link among the multi-links. On the other hand, if the MLD performs the STR operation when the band separation between the multi-links is insufficient, in-device coexistence (IDC) interference, which is interference between the multi-links, may occur. Therefore, when the band separation between the multi-links is not sufficient, the MLD may not be able to perform the STR operation.

For example, a multi-link including a first link, a second link, and a third link may be configured between an AP MLD and a non-AP MLD 1. If a band separation between the first link and the third link is sufficient, the non-AP MLD may perform the STR operation using the first link and the third link. In other words, the non-AP MLD may transmit a frame using the first link and may receive a frame using the third link. If the band separation between the first link and the second link is not sufficient, the non-AP MLD may not be able to perform the STR operation using the first link and the second link. If the band separation between the second link and the third link is not sufficient, the non-AP MLD may not be able to perform the STR operation using the second link and the third link.

Figure 4:
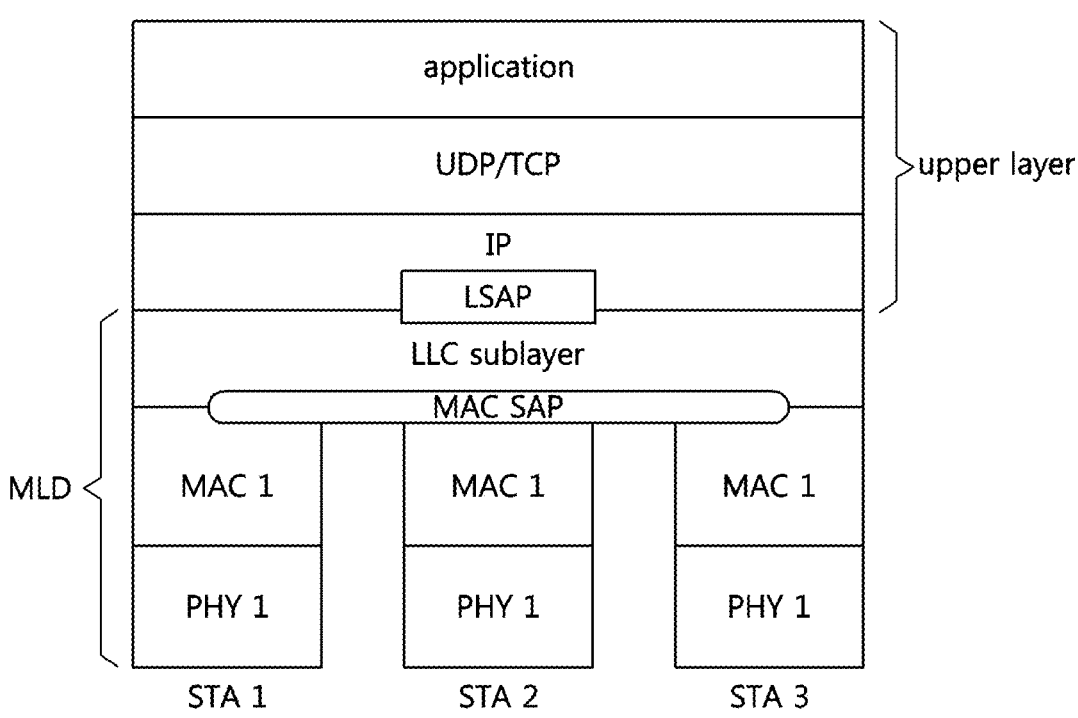
FIG. 4 is a conceptual diagram illustrating a first embodiment of a hierarchical structure of a multi-link device (MLD).

FIG. 4 is a conceptual diagram illustrating a first embodiment of a hierarchical structure of an MLD.

As shown in FIG. 4, an MLD may include a plurality of layers. The uppermost layer may be an application layer. A lower layer of the application layer may be a transport layer. The transport layer may ensure transmission reliability between a transmitting node and a receiving node. For example, a user datagram protocol (UDP)/transmission control protocol (TCP) layer may perform operations of the transport layer. A lower layer of the transport layer may be a network layer. For example, an internet protocol (IP) layer may perform operations of the network layer.

The MLD may include a data link layer. The data link layer may support transmission functions between communication nodes. For example, the data link layer may include a logical link control (LLC) layer (e.g., LLC sublayer) and a medium access control (MAC) layer. In addition, the MLD may further include a physical layer. The physical layer may support a transmission/reception function of a physical signal.

The MLD may include a physical layer and a MAC layer for each link for the multi-link operation. The MAC layer for each link may have a different MAC address. The MLD may include a plurality of communication nodes (e.g., STAs or APs), and each of the plurality of communication nodes may be configured with a physical layer and a MAC layer. The MLD may further include a management unit that manages the plurality of communication nodes (e.g., independent communication nodes). The management unit may be a logical entity.

In communications between communication nodes, a transmitting node may transmit data directly to a receiving node. In this case, a procedure for transmitting data to a destination through a plurality of communication nodes (e.g., network nodes) may not be required. Accordingly, the transport layer, network layer, and/or data link layer may not be required. In order to simplify the functions of the network layer and the data link layer, the MLD may include a wireless access in vehicular environments (WAVE) short message protocol (WSMP) layer that performs the functions of the transport layer and the data link layer. The WSMP layer may replace the transport layer and the data link layer.

Meanwhile, for operations in each layer, the upper layer may exchange data and additional information with the lower layer through a link service access point (LSAP). For example, the LLC sublayer may obtain data, a source address, and/or a destination address from the WSMP layer (or IP layer) through the LSAP. When data is transmitted in the WSMP layer, the LLC sublayer may obtain a channel load parameter measured by the communication node through the LSAP. Among parameters of the LSAP, which are used in WAVE, parameters other than DL-UNITDA-TA.request related parameters obtained from the upper layer may be the same as parameters of a service access point (SAP). The DL-UNITDATA.request related parameters may include parameter(s) for a WAVE operation and/or parameter(s) for a multi-link operation. The parameter(s) for a WAVE operation and/or the parameter(s) for a multi-link operation may be transmitted in form of DL-UNITDA-TAX.request.

One or more parameters among the parameters obtained through the LSAP may be included in a WSMP message, and the WSMP message may be transmitted to another communication node. The lower layer may determine whether to perform a specific function based on one or more parameters included in the WSMP message. Information indicating whether to use an additional function of the MAC layer may be transmitted to the MAC layer through a MAC SAP. The information indicating whether to use an additional function of the MAC layer may be transmitted to the MAC layer by adding a parameter to MA-UNITDATA.request of the MAC SAP or MA-UNITDATAX.request used in the IEEE 1609.4.

Figure 5:
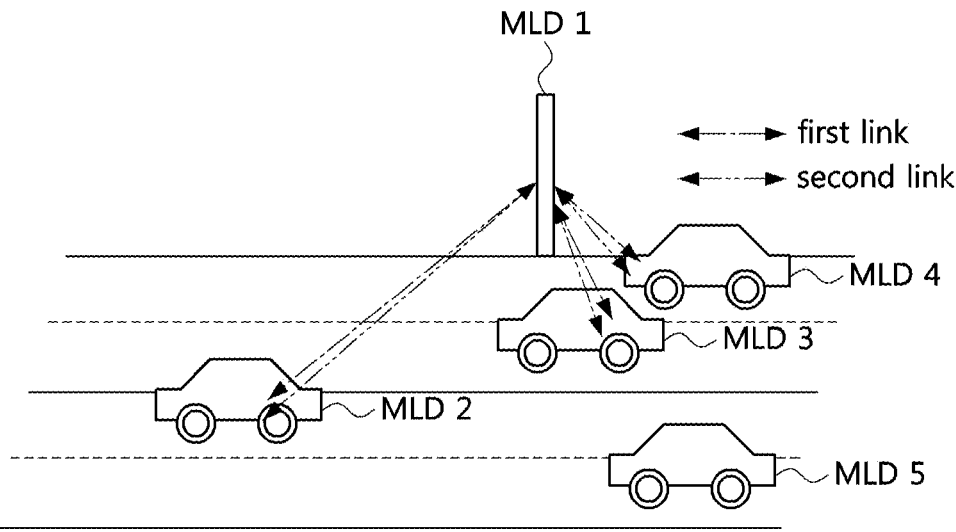
FIG. 5 is a conceptual diagram illustrating a first embodiment of a communication method in a wireless LAN system including MLDs.

FIG. 5 is a conceptual diagram illustrating a first embodiment of a communication method in a wireless LAN system including MLDs.

As shown in FIG. 5, an MLD 1 may transmit a plurality of data frames by using a multi-link (e.g., first link and second link), and other MLDs (e.g., MLD 2, MLD 3, and/or MLD 4) may receive data frame(s) from the MLD 1. In this case, the data frame may be transmitted and received individually for each MLD. A band in which the data frame is transmitted may be a band of the first link and/or a band of the second link. For example, the second link may be used for transmission and reception of large-capacity data (e.g., video data). In this case, a signal of the second link may have a directionality (e.g., line of sight (LoS) characteristics).

In the wireless LAN system shown in FIG. 5, the probe step, the authentication step, and the association step may not be performed. MLDs that do not belong to a specific BSS may transmit/receive data. In other words, MLDs may transmit and receive data in the 'outside context of a BSS (OCB)' scheme. Accordingly, the AP may not periodically transmit beacon frames.

Since the second link has directionality, in order to perform a data transmission operation between the MLD 1 and another MLD using the second link, a negotiation procedure may be performed before the corresponding data transmission operation is performed. The negotiation procedure for using the second link may be performed in the first link as in the embodiments shown in FIGS. 7 and 8 below.

Figure 6:
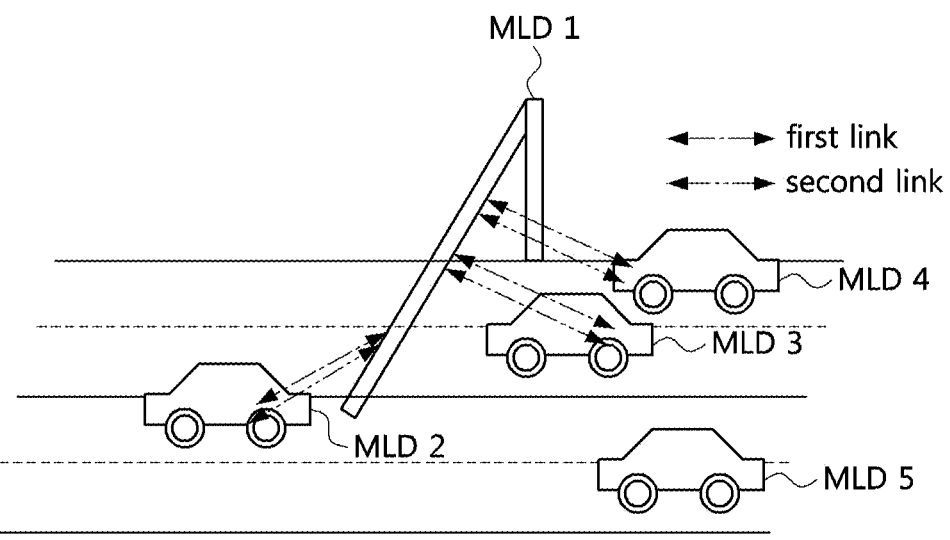
FIG. 6 is a conceptual diagram illustrating a second embodiment of a communication method in a wireless LAN system including MLDs.

FIG. 6 is a conceptual diagram illustrating a second embodiment of a communication method in a wireless LAN system including MLDs.

As shown in FIG. 6, the MLD 1 may perform a transmission/reception operation of a data frame in the second link. In this case, the data frame may not be transmitted in a different direction for each of the MLDs. In other words, the data frame may be transmitted in a predetermined direction in the second link. In the wireless LAN system shown in FIG. 6, the probe step, the authentication step, and the association step may not be performed. MLDs that do not belong to a specific BSS may transmit/receive data. In other words, the MLDs may transmit and receive data in an OCB scheme. A negotiation procedure for communications using the second link may be performed in the first link as in the embodiments shown in FIGS. 7 and 8 below.

Figure 7A:
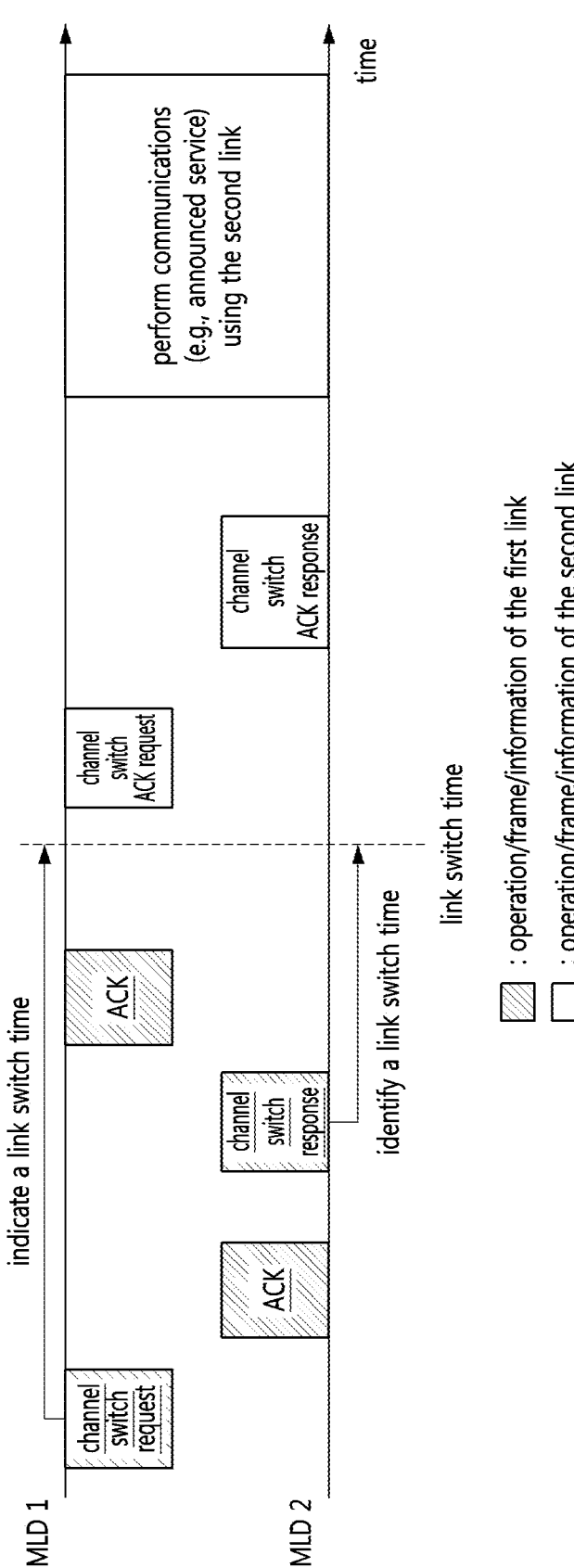
FIG. 7A is a timing diagram illustrating a first embodiment of a negotiation procedure for using a second link in a wireless LAN system.
Figure 7B:
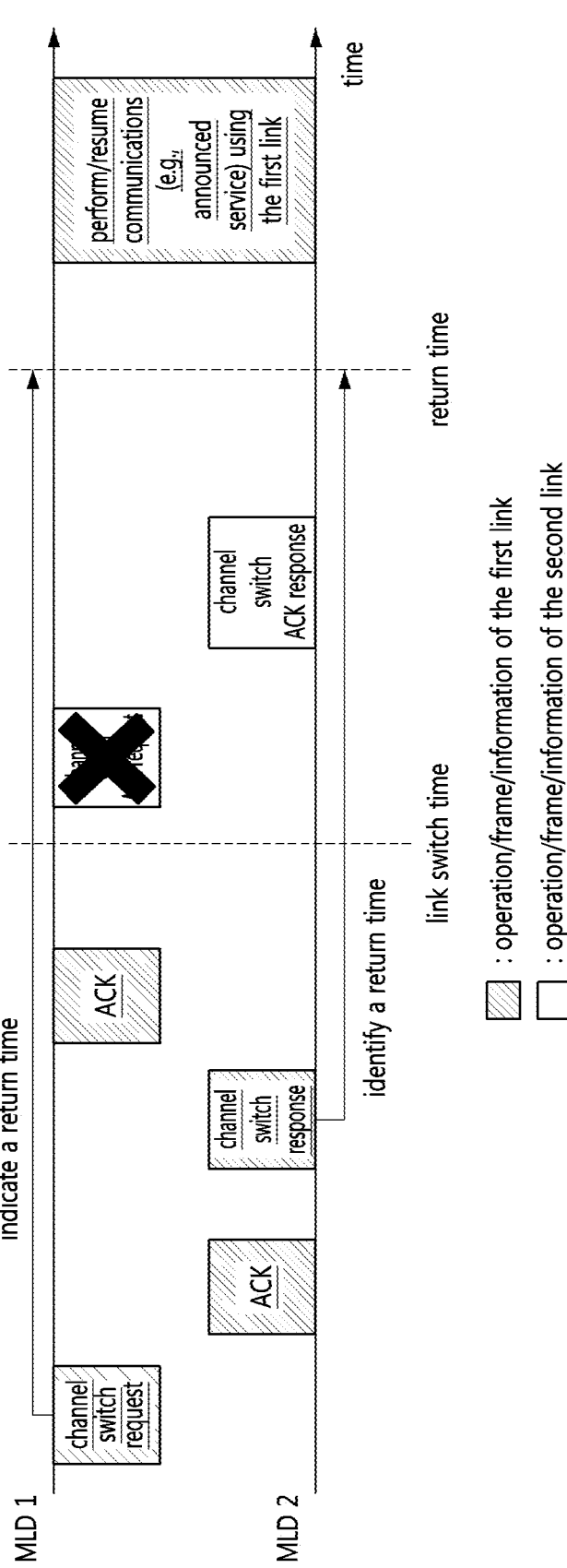
FIG. 7B is a timing diagram illustrating a second embodiment of a negotiation procedure for using a second link in a wireless LAN system.

FIG. 7A is a timing diagram illustrating a first embodiment of a negotiation procedure for using a second link in a wireless LAN system, and FIG. 7B is a timing diagram illustrating a second embodiment of a negotiation procedure for using a second link in a wireless LAN system.

As shown in FIGS. 7A and 7B, a channel measurement procedure for configuring a transmission direction of the second link may not be required. In this case, a negotiation procedure for using the second link may be performed in the first link. The MLD 1 that wants to communicate with the MLD 2 by using the second link may transmit information indicating data transmission using the second link (hereinafter, referred to as 'data transmission indication information') through the first link. The data transmission indication information may be included in a channel switch request frame.

In addition, the channel switch request frame may include channel information of the second link, a use time (e.g., link switch time) of the second link, a return time of the first link, a type of an MLD transmitting the channel switch request frame, a type of an MLD transmitting a channel switch response frame, and/or a type of data to be transmitted in the second link. When a signal of the second link is transmitted in a predetermined direction, the channel switch request frame may further include information indicating the transmission direction. The return time of the first link may indicate a time of switching from the second link to the first link when communication using the second link fails. The type of the MLD transmitting the channel switch request frame and/or the channel switch response frame may indicate an MLD that initiates a channel measurement procedure for configuring a transmission direction of the second link or may indicate an MLD that supports a channel measurement procedure initiated by another MLD.

The MLD 1 may transmit the channel switch request frame in the first link. The MLD 2 may receive the channel switch request frame from the MLD 1 in the first link. The channel switch request frame may include system information (e.g., system parameters) required for data transmission/reception in the second link. Accordingly, the MLD 2 may acquire the corresponding system information by receiving the channel switch request frame. In this case, the MLD 2 may perform communication in the second link by using the system information received through the first link without receiving system information (i.e., system information for the second link) in the second link.

When the channel switch request frame is successfully received, the MLD 2 may transmit an acknowledgement (ACK) for the channel switch request frame to the MLD 1 in the first link. When the ACK for the channel switch request frame is received from the MLD 2, the MLD 1 may determine that the channel switch request frame has been successfully received at the MLD 2.

The MLD 2 may identify information element(s) included in the channel switch request frame and may transmit a channel switch response frame that is a response for the channel switch request frame to the MLD 1 through the first link. The channel switch response frame may indicate that an operation requested by the channel switch request frame and/or the information element(s) included in the channel switch request frame are confirmed (or approved). The MLD 1 may receive the channel switch response frame from the MLD 2 in the first link. When the channel switch response frame is successfully received, the MLD 1 may identify information element(s) included in the channel switch response frame and may transmit an ACK for the channel switch response frame to the MLD 2 in the first link. When the ACK for the channel switch response frame is received from the MLD 1, the MLD 2 may determine that the channel switch response frame has been successfully received at the MLD 1.

The channel switch request frame may be the same as or similar to a fast session transfer (FST) request frame, and the channel switch response frame may be the same as or similar to an FST response frame. When the procedure of exchanging the channel switch request/response frames is completed and the link switch time indicated by the channel switch request frame and/or the channel switch response frame has passed, a procedure of exchanging a channel switch ACK request frame and a channel switch ACK response frame may be performed to identify whether communication in the second link is possible. Each of the channel switch ACK request frame and the channel switch ACK response frame may be an arbitrary frame.

For example, the MLD 1 may transmit a channel switch ACK request frame to the MLD 2 in the second link. When the channel switch ACK request frame is received from the MLD 1, the MLD 2 may transmit a channel switch ACK response frame to the MLD 1 in response to the channel switch ACK request frame in the second link. When the channel switch ACK frame is received from the MLD 2, the MLD 1 may determine that communication is possible in the second link. In other words, when the procedure of exchanging the channel switch ACK request/response frames is completed, the MLD 1 and the MLD 2 may determine that communication is possible in the second link. Accordingly, the MLD 1 and the MLD 2 may perform communications in the second link.

In the procedure of identifying whether communication in the second link is possible, only the channel switch ACK response frame indicating that the link (e.g., channel) has been successfully switched may be transmitted without transmission of the channel switch ACK request frame. The channel switch ACK response frame may be a PS-Poll frame. On the other hand, if the procedure of exchanging the channel switch ACK request/response frames is not completed within a preset period, communication may be performed in the first link after the return time indicated by the channel switch request frame and/or the channel switch response frame. In this case, the MLD 1 and the MLD 2 may perform a renegotiation procedure for using the second link.

In another embodiment, the channel switch request frame may be used to request provision of system information (e.g., system parameters) for the second link. In this case, the channel switch response frame may include system information requested by the channel switch request frame. The system information included in the channel switch response frame may include system information of the STA that has received the channel switch request frame and/or system information of other STA(s) included in the same MLD as the STA that has received the channel switch request frame. Here, the STA may be an AP STA or a non-AP STA.

Each of the channel switch request frame and the channel switch response frame may be a control frame, a management frame, an extension frame, or an action frame. For example, when the channel switch request frame is a probe request frame, the channel switch response frame may be a probe response frame. Alternatively, when the channel switch request frame is an association request frame, the channel switch response frame may be an association response frame. Alternatively, the channel switch response frame may be a beacon frame.

Meanwhile, when the channel measurement procedure for configuring the transmission direction of the second link is required, the channel measurement procedure may be additionally performed after the negotiation procedure for using the second link as in the following embodiments.

Figure 8A:
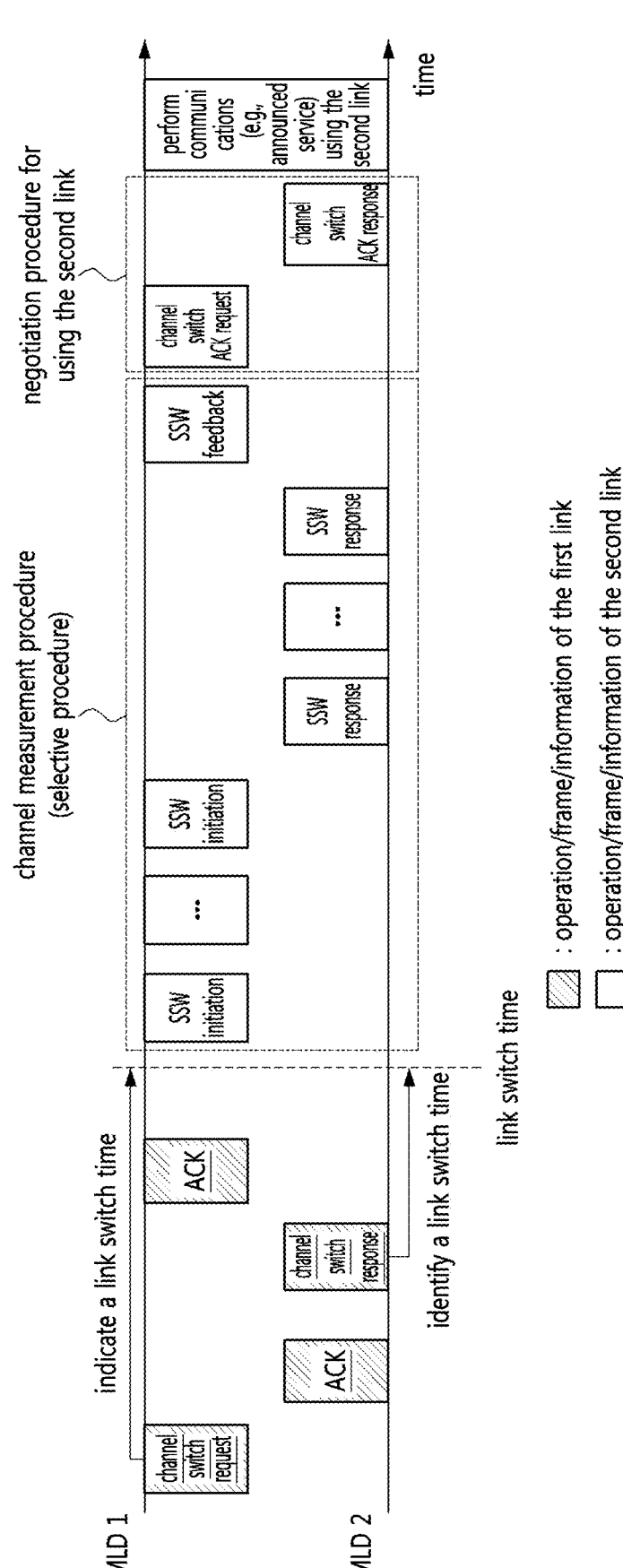
FIG. 8A is a timing diagram illustrating a third embodiment of a negotiation procedure for using a second link in a wireless LAN system.
Figure 8B:
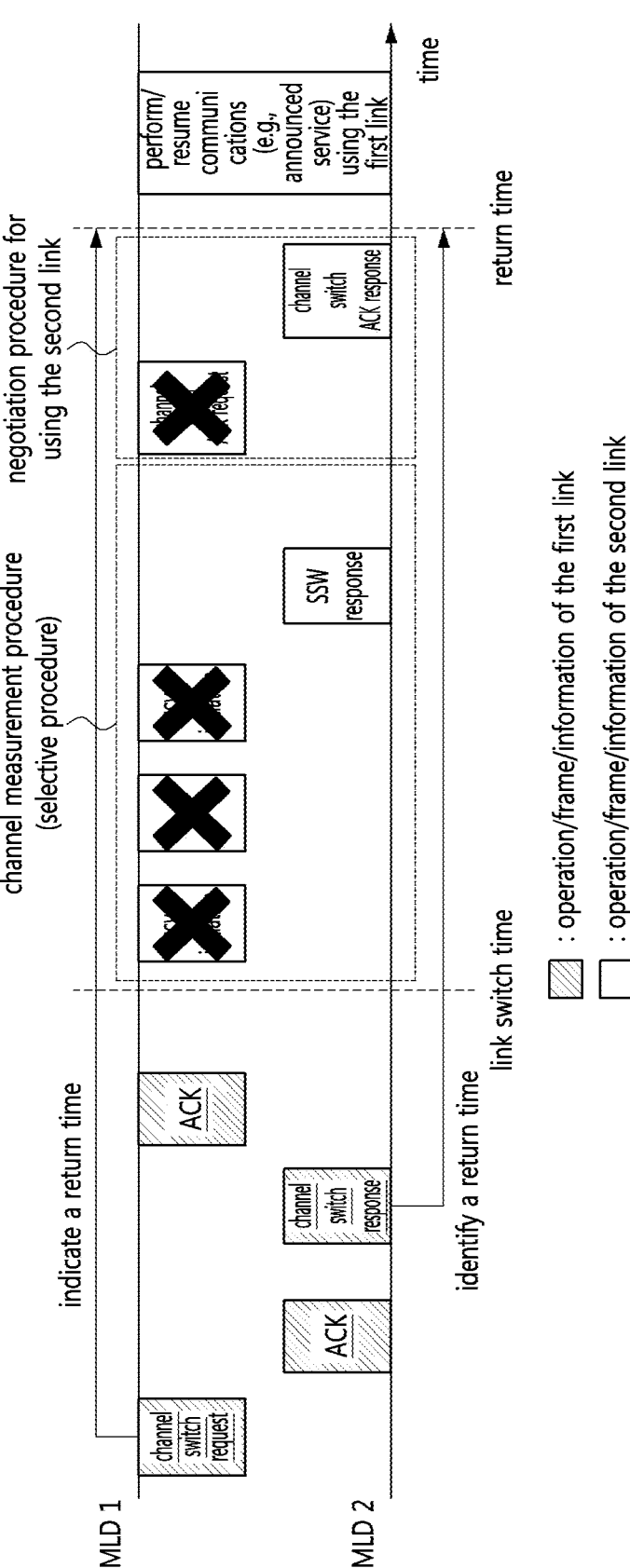
FIG. 8B is a timing diagram illustrating a fourth embodiment of a negotiation procedure for using a second link in a wireless LAN system.

FIG. 8A is a timing diagram illustrating a third embodiment of a negotiation procedure for using a second link in a wireless LAN system, and FIG. 8B is a timing diagram illustrating a fourth embodiment of a negotiation procedure for using a second link in a wireless LAN system.

As shown in FIGS. 8A and 8B, in the negotiation procedure for using the second link, the channel measurement procedure for configuring the transmission direction of the second link may be required. The MLD 1 desiring to communicate with the MLD 2 by using the second link may transmit information indicating data transmission using the second link (i.e., 'data transmission indication information') in the first link. The data transmission indication information may be included in the channel switch request frame.

In addition, the channel switch request frame may include channel information of the second link, a use time (e.g., link switch time) of the second link, a return time of the first link, a type of an MLD transmitting the channel switch request frame, a type of an MLD transmitting a channel switch response frame, and/or a type of data to be transmitted in the second link. When a signal of the second link is transmitted in a predetermined direction, the channel switch request frame may further include information indicating the transmission direction. The channel switch request frame and/or the channel switch response frame may further include information indicating whether the channel measurement procedure for configuring a transmission direction is required. The return time of the first link may indicate a time of switching from the second link to the first link when communication using the second link fails. The type of the MLD transmitting the channel switch request frame and/or the channel switch response frame may indicate an MLD that initiates a channel measurement procedure for configuring a transmission direction of the second link or may indicate an MLD that supports a channel measurement procedure initiated by another MLD.

The MLD 1 may transmit the channel switch request frame in the first link. The MLD 2 may receive the channel switch request frame from the MLD 1 in the first link. When the channel switch request frame is successfully received, the MLD 2 may transmit an ACK for the channel switch request frame to the MLD 1 in the first link. When the ACK for the channel switch request frame is received from the MLD 2, the MLD 1 may determine that the channel switch request frame has been successfully received at the MLD 2.

The MLD 2 may identify the information element(s) included in the channel switch request frame and may transmit a channel switch response frame that is a response to the channel switch request frame to the MLD 1 through the first link. The channel switch response frame may indicate that an operation requested by the channel switch request frame and/or the information elements included in the channel switch request frame are confirmed (or approved). The MLD 1 may receive the channel switch response frame from the MLD 2 in the first link. When the channel switch response frame is successfully received, the MLD 1 may identify information element(s) included in the channel switch response frame and may transmit an ACK for the channel switch response frame to the MLD 2 in the first link. When the ACK for the channel switch response frame is received from the MLD 1, the MLD 2 may determine that the channel switch response frame has been successfully received at the MLD 1.

The channel switch request frame may be the same as or similar to an FST request frame, and the channel switch response frame may be the same as or similar to an FST response frame. When the procedure of exchanging the channel switch request/response frames is completed and the link switch time indicated by the channel switch request frame and/or the channel switch response frame has passed, a procedure for exchanging a channel switch ACK request frame and a channel switch ACK response frame may be performed to identify whether communication in the second link is possible. Each of the channel switch ACK request frame and the channel switch ACK response frame may be an arbitrary frame.

When the channel measurement procedure for configuring a transmission direction is required, a frame for the channel measurement procedure (e.g., a sector sweep (SSW) initiation frame) may be transmitted instead of the channel switch ACK request frame. The channel measurement procedure for configuring the transmission direction between the transmitting node (e.g., MLD 1) and the receiving node (e.g., MLD 2) may be performed instead of the negotiation procedure for using the second link. When the channel measurement procedure for configuring the transmission direction is not required, the negotiation procedure for using the second link may be performed. Alternatively, the channel measurement procedure for configuring the transmission direction and the negotiation procedure for using the second link may be sequentially performed in the second link. In the channel measurement procedure, a communication operation in the second link may be performed by receiving a beacon frame. In the channel measurement procedure, an operation of receiving system information (e.g., system parameters) of a link to be switched may be performed.

In the channel measurement procedure, the MLD 1 may transmit the SSW initiation frame through the second link. The SSW initiation frame may be transmitted in a sweeping scheme (e.g., beam sweeping scheme). The MLD 2 may receive the SSW initiation frame from the MLD 1 in the second link and may transmit an SSW response frame through the second link. The SSW response frame may be a response to the SSW initiation frame and may be transmitted in a sweeping scheme. The MLD 1 may receive the SSW response frame from the MLD 2 in the second link and may transmit an SSW feedback frame through the second link. The SSW feedback frame may be a response to the SSW response frame. In the channel measurement procedure, only the SSW response frame (or SSW feedback frame) indicating that the channel measurement procedure is performed may be transmitted/received without transmission of the SSW initiation frame.

When the channel measurement procedure (e.g., the procedure of exchanging the SSW initiation frame, the SSW response frame, and/or the SSW feedback frame) is completed, the MLD 1 may perform communications with the MLD 2 in the second link. On the other hand, if the procedure of exchanging the channel switch ACK request/ response frames is not completed within a preset period, communications may be performed in the first link after the return time indicated by the channel switch request frame and/or the channel switch response frame. In this case, the MLD 1 and the MLD 2 may perform a renegotiation procedure for using the second link.

Meanwhile, in a direct communication procedure between communication nodes, data (e.g., video data) may be continuously transmitted in the second link configured between the MLD 1 and the MLD 2. The MLD 1 may coordinate and/or confirm an association procedure (e.g., access procedure) of the second link with another communication node (e.g., another MLD). In this case, a negotiation procedure between communication nodes (e.g., MLDs) in the second link may be performed individually.

Figure 9:
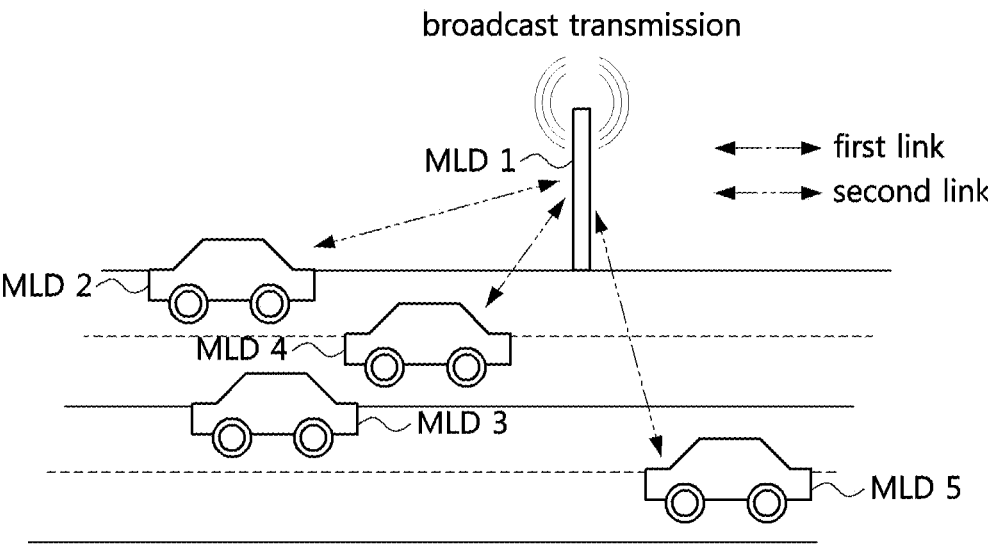
FIG. 9 is a conceptual diagram illustrating a third embodiment of a communication method in a wireless LAN system including MLDs.

FIG. 9 is a conceptual diagram illustrating a third embodiment of a communication method in a wireless LAN system including MLDs.

As shown in FIG. 9, MLDs may be devices supporting both the first link and the second link, and the MLD 1 may periodically or aperiodically transmit system information (e.g., system parameters) used for communication through the second link in the first link. Here, the system information may be transmitted in a broadcast scheme. The MLD 2 to MLD 5 may receive the system information through the first link and may perform communications in the second link by using the system information. For example, the MLD 2 to MLD 5 may receive a data frame from the MLD 1 in the second link by using the system information acquired in the first link. A transmission scheme in the second link may be a broadcast scheme.

Other MLDs (e.g., MLD 2, MLD 4, and MLD 5) located around the MLD 1 may receive the data frame in the second link. A frame including large-capacity data (e.g., video data) may be transmitted through the second link. A signal (e.g., frame) transmitted in the second link may have directionality. Thus, in order to transmit a frame to all neighboring MLDs, the same frame may be transmitted multiple times in different directions.

The MLD may receive a plurality of frames and may identify sequence numbers included in the plurality of frames. The MLD may deliver one packet from among packets having the same sequence number to an upper layer and may discard the remaining packets. In the wireless LAN system shown in FIG. 9, the probe step, the authentication step, and the association step may not be performed. MLDs that do not belong to a specific BSS may transmit/receive data. In other words, the MLDs may transmit and receive data in the OCB scheme. Accordingly, the AP may not periodically transmit beacon frames.

A data transmission procedure between the MLD 1 and the MLD 2 may be performed in the second link. In this case, it may not be easy to transmit a frame in a broadcast scheme due to the second link having directionality. Accordingly, a frame including a second link support element indicating that a data transmission procedure can be performed using the second link (hereinafter, referred to as 'second link support frame') may be transmitted in the first link. The second link support frame may be a beacon frame and may be transmitted in form of a broadcast frame in the first link.

Figure 10:
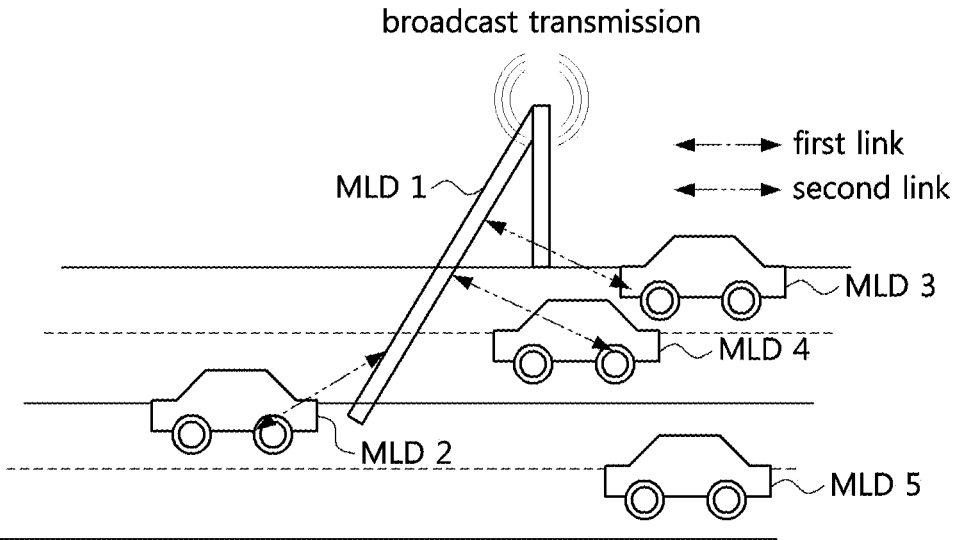
FIG. 10 is a conceptual diagram illustrating a fourth embodiment of a communication method in a wireless LAN system including MLDs.

FIG. 10 is a conceptual diagram illustrating a fourth embodiment of a communication method in a wireless LAN system including MLDs.

As shown in FIG. 10, MLDs may be devices supporting both the first link and the second link, and the MLD 1 may periodically or aperiodically transmit system information (e.g., system parameters) used for communication through the second link in the first link. Here, the system information may be transmitted in a broadcast scheme. The MLD 2 to MLD 5 may receive the system information through the first link and may perform communications in the second link by using the system information. For example, the MLD 2 to MLD 5 may receive a data frame from the MLD 1 in the second link by using the system information acquired in the first link. A transmission scheme in the second link may be a broadcast scheme. A data frame may be transmitted in a predetermined direction instead of in several directions. For example, the data frame may be transmitted in a preconfigured direction (e.g., a direction in which communication is easily performed). The number of repeated transmissions of the data frame may be reduced.

In the wireless LAN system shown in FIG. 10, the probe step, the authentication step, and the association step may not be performed. MLDs that do not belong to a specific BSS may transmit/receive data. In other words, the MLDs may transmit and receive data in the OCB scheme. In this case, a frame including a second link support element indicating that a broadcast frame transmission procedure can be performed in the second link (i.e., second link support frame) may be transmitted in the first link. The second link support frame may be transmitted in the first link in form of a broadcast frame. The second link support frame may be a beacon frame.

Figure 11:
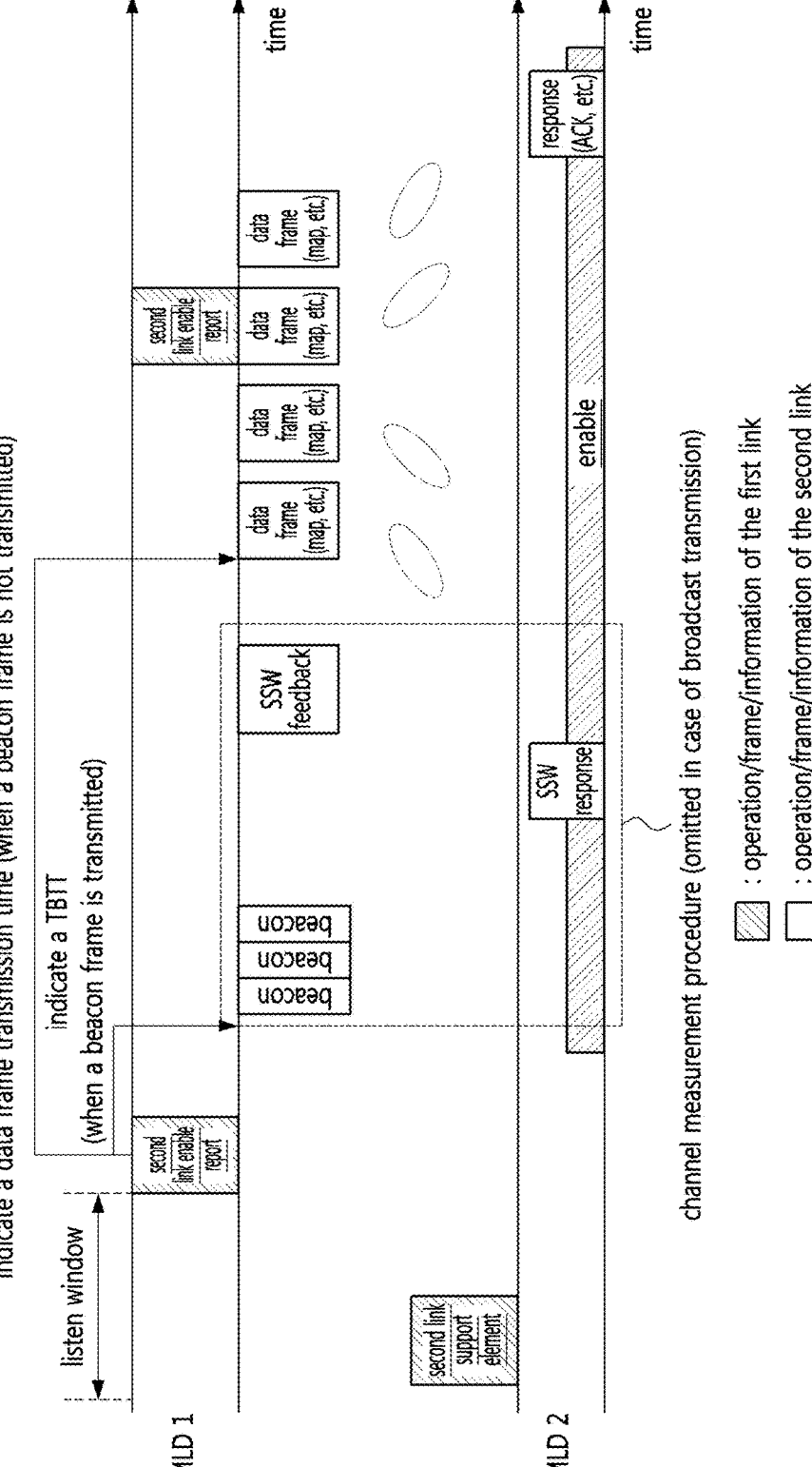
FIG. 11 is a timing diagram illustrating a first embodiment of a method for transmitting a frame in a wireless LAN system.

FIG. 11 is a timing diagram illustrating a first embodiment of a method for transmitting a frame in a wireless LAN system.

As shown in FIG. 11, the MLD 1 may communicate with other MLDs including the MLD 2 in the first link and the second link. For example, the MLD 1 may transmit a frame (e.g., data frame) in the second link. Here, the frame may be transmitted in a broadcast scheme. In order to receive the data frame in the second link, other MLDs may match system information (e.g., system parameters) for communications in the second link to system information (e.g., system parameters) for the second link of the MLD 1. The MLD 1 may transmit a beacon frame in the second link so that other MLDs match the system information (e.g., system parameters) used for communications in the second link. Other MLDs may receive the beacon frame from the MLD 1. When the beacon frame is received from the MLD 1, other MLDs may adjust the system information used for communications in the second link. The above-described procedure may be referred to as 'channel measurement procedure'.

In order to quickly support the communication operation in the second link, in the first link, the MLD 1 may periodically transmit information indicating that communication (e.g., broadcast transmission) is to be performed in the second link and/or information on a time (i.e., target beacon transmission time (TBTT)) at which a beacon frame is transmitted in the second link. The TBTT information indicating a time at which a beacon frame is transmitted in the second link may be referred to as 'second link TBTT information'. The information indicating that communication is to be performed in the second link and/or the second link TBTT information may be included in a second link enable report frame. The MLD 1 may periodically transmit the second link enable report frame in the first link regardless of presence of a neighboring MLD. Information element (s) included in the second link enable report frame may be included in a beacon frame or a management frame (e.g., probe request frame and/or probe response frame). For example, the MLD 1 may transmit a beacon frame or management frame including the information indicating that communication is to be performed in the second link and/or the second link TBTT information in the first link.

The transmission procedure of the second link enable report frame may be performed when information indicating support of communications in the second link (hereinafter, 'second link support element') is received from another MLD (e.g., MLD 2). The second link support element may mean an MLD capability element or a multi-link capability element. The second link support element may include an identifier indicating the second link. The second link support element may be included in a data frame and/or a management frame. For example, the MLD 2 may transmit a data frame and/or management frame including the second link support element in the first link. The management frame may be a probe request frame. The MLD 1 may perform a monitoring operation in a preset period (e.g., listen window) in order to receive the frame including the second link support element.

If the frame including the second link support element is not received in the preset period, the MLD 1 may determine that there is no other MLD supporting communications in the second link. In this case, the MLD 1 may not transmit the second link enable report frame. If transmission of the second link enable report frame is omitted, the MLD 1 may transmit a data frame in the first link. On the other hand, when the second link support element is obtained from the MLD 2 in a preset period, the MLD 1 may determine that the MLD 2 supports communications in the second link. In this case, the MLD 1 may transmit the second link enable report frame to the MLD 2.

The information indicating whether communications in the second link are supported (e.g., second link support element) may be included in a header of an arbitrary frame (e.g., data frame and/or management frame). Alternatively, the second link support element may be included in a management frame such as a probe request frame. The arbitrary frame or management frame including the second link support element may be transmitted periodically or aperiodically in the first link. The MLD 1 may receive the arbitrary frame or management frame from another MLD and may identify presence of other MLDs that support communications in the second link by identifying an information element (e.g., second link support element) included in the header of the arbitrary frame or an information element of the management frame.

The second link enable report frame may include system information (e.g., system parameters) required for communications in the second link. For example, the second link enable report frame (e.g., system information) may include channel information (e.g., information of the second link), information indicating whether to perform a channel measurement procedure for configuring a transmission direction, and/or information indicating a data transmission time in the second link. In addition, when a beacon frame is transmitted, the second link enable report frame may include information indicating a target beacon transmission time (TBTT). The system information (e.g., system parameters) transmitted through the first link may be system information (e.g., system parameters) included in the beacon frame transmitted through the second link. Upon receiving the second link enable report frame transmitted through the first link, the MLD 2 may determine that communications between the MLD 1 and the MLD 2 can be performed in the second link and may preconfigure system information (e.g., system parameters) for communications in the second link based on the information element(s) included in the second link enable report frame. In other words, the system information for communications in the second link may be preconfigured based on the system information obtained through the first link.

Meanwhile, transmission of the second link enable report frame may be triggered by a frame requesting provision of system information (e.g., system parameters) (hereinafter, referred to as 'trigger frame'). For example, the MLD 2 may transmit a trigger frame requesting provision of system information for communications in the second link through the first link. The MLD 1 may receive the trigger frame from the MLD 2 and may transmit a second link enable report frame to the MLD 2 in response to the trigger frame. The second link enable report frame may include information requested by the trigger frame (e.g., system information for communications in the second link).

The system information included in the second link enable report frame may include system information of a STA that has received the trigger frame and/or system information of other STA(s) included in the same MLD as the STA that has received the trigger frame. Here, the STA may be an AP STA or a non-AP STA. The trigger frame may be a frame including the second link support element. Each of the trigger frame and the second link enable report frame may be a control frame, a management frame, a data frame, or an action frame. For example, when the trigger frame is a probe request frame, the second link enable report frame may be a probe response frame. Alternatively, when the trigger frame is an association request frame, the second link enable report frame may be an association response frame. Alternatively, the second link enable report frame may be a beacon frame.

The system information (e.g., system parameters) included in the second link enable report frame transmitted in the first link may be the same as the system information (e.g., system parameters) included in the beacon frame transmitted in the second link. In this case, a transmission time indicated by the second link enable report frame may be a time at which a channel measurement procedure initiated by transmission of the beacon frame is performed. Alternatively, when the channel measurement procedure is not performed, the time indicated by the second link enable report frame may be a transmission time of a data frame. When the channel measurement procedure is performed, the second link enable report frame may further include information of an address of an MLD that transmits a response frame (or feedback frame) for the channel measurement. A form of a frame initiating the channel measurement procedure may be a beacon frame.

When only a broadcast frame is transmitted in the second link, the channel measurement procedure may be omitted. In this case, the second link enable report frame may include information indicating that only a broadcast frame is transmitted. In other words, the second link enable report frame may indicate that the channel measurement procedure is not performed. Alternatively, the second link enable report frame may include only information of a broadcast frame transmitted in the second link, and the negotiation procedure shown in FIGS. 7 and/or 8 may be separately performed for transmission of other frames.

When the channel measurement procedure is completed or when the time indicated by the second link enable report frame has passed, the MLD 1 may determine that configuration of system information (e.g., system parameters) for the MLD 2 to receive a data frame in the second link has been completed. In this case, the MLD 1 may transmit a data frame (e.g., frame including video data) in the second link in a broadcast scheme, a multicast scheme, a groupcast scheme, or a unicast scheme. When the second link has directionality such as in a 60 GHz band, the MLD 1 may repeatedly transmit a data frame in different directions in the second link. Alternatively, the MLD 1 may transmit a data frame in preconfigured directions (e.g., one direction or two directions) in the second link. In this case, the preconfigured directions in which the data frame is transmitted may be indicated by the second link enable report frame. The second link enable report frame may be transmitted periodically. The second link enable report frame transmitted in a period #n may include information for a data frame transmitted in the period #n. In this case, n may be a natural number.

Figure 12:
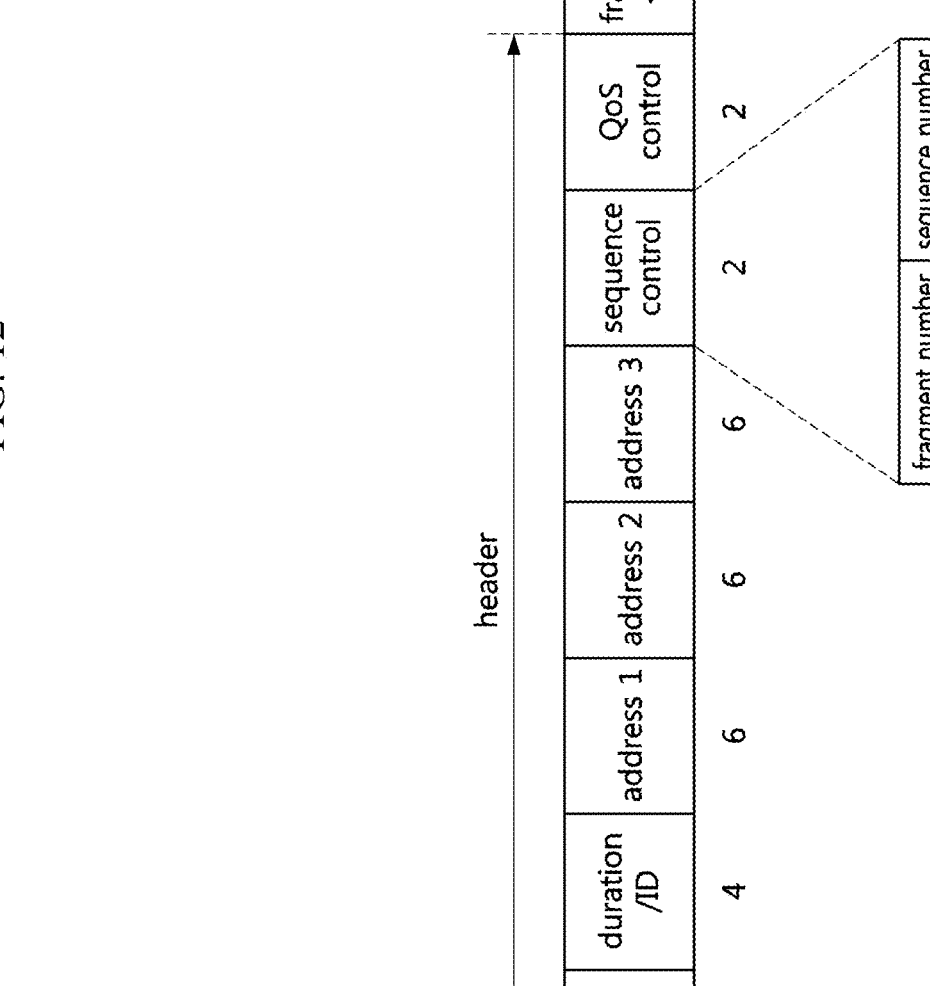
FIG. 12 is a conceptual diagram illustrating a first embodiment of a frame including a second link support element in a wireless LAN system.

FIG. 12 is a conceptual diagram illustrating a first embodiment of a frame including a second link support element in a wireless LAN system.

As shown in FIG. 12, a frame may include a frame control field, a duration/ID field, address fields (e.g., address 1, address 2, address 3), a sequence control field, a quality of service (QoS) control field, a frame body field, and a frame check sequence (FCS) field. A header may consist of or comprise the fields located before the frame body in the frame. The second link support element may be included in the header of the frame. The second link support element may indicate whether an MLD transmitting the frame supports communication in the second link.

When the frame is transmitted in the first link, a fragmentation function may not be used. In this case, a fragment number field included in the sequence control field may be configured to indicate capability information of the MLD. The capability information may include the second link support element. Alternatively, an HT control field in the frame may include the second link support element. Alternatively, the duration/ID field may indicate 'actual transmission time of the frame+time A', and the time A may not be considered for data transmission. In other words, the time A may be used as the second link support element. Alternatively, the frame may include an additional information element, and the additional information element may be the second link support element.

Figure 13:
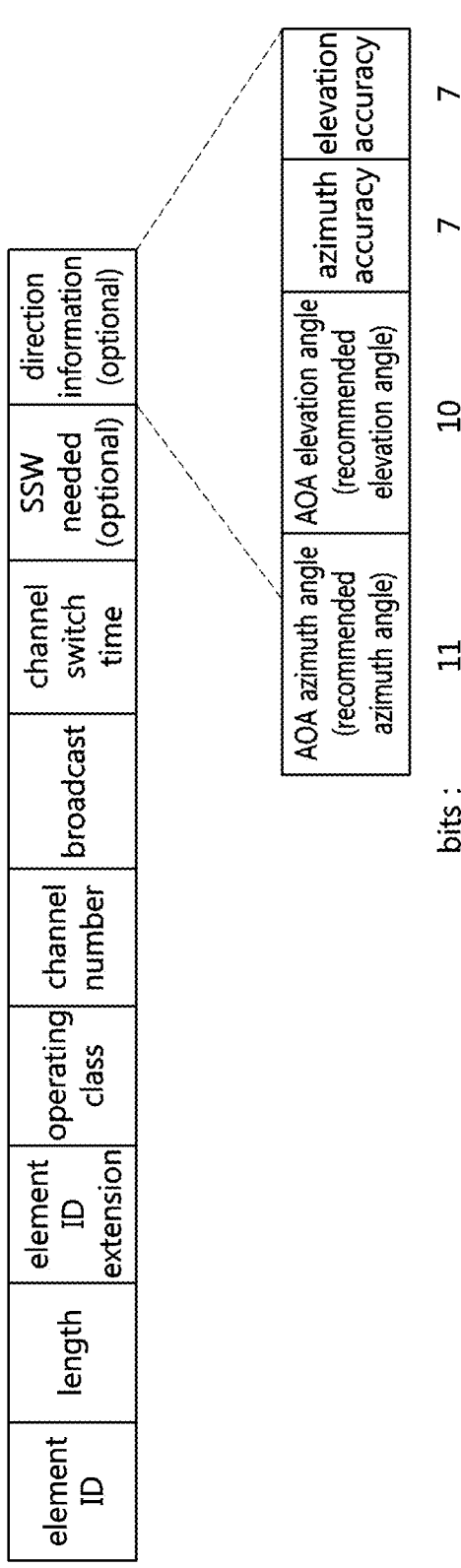
FIG. 13 is a conceptual diagram illustrating a first embodiment of a frame including information elements required for communications in a second link in a wireless LAN system.

FIG. 13 is a conceptual diagram illustrating a first embodiment of a frame including information elements required for communication in a second link in a wireless LAN system.

As shown in FIG. 13, a frame including the second link support element for using the second link for transmission of a data frame may be transmitted. The frame (e.g., second link enable report frame shown in FIG. 11) may include information elements (e.g., system information) required for communications in the second link. For example, the frame may include one or more of an element ID field, a length field, an element ID extension field, an operating class field, a channel number field, a broadcast field, or a channel switch time field. In addition, the frame may further include a sector sweep (SSW) needed field indicating whether a channel measurement procedure is required and may further include a direction information field indicating a transmission direction (e.g., transmission direction or reception direction).

The operating class field and/or the channel number field may indicate a channel through which a frame (e.g., data frame) is transmitted in the second link. The channel switch time field may indicate a time at which the data frame is transmitted in the second link or may indicate a time at which the first link is switched to the second link. The broadcast field set to a first value may indicate that the frame is not transmitted in a broadcast scheme. In this case, the frame may be transmitted in a unicast scheme. The broadcast field set to a second value may indicate that the frame is transmitted in a broadcast scheme.

The direction information field may indicate a transmission direction and/or a reception direction (e.g., recommended reception direction) of a frame (e.g., broadcast frame). The direction information field may include an angle of arrival (AOA) azimuth field, an AOA elevation field, an azimuth accuracy field, and/or an elevation accuracy field. The AOA azimuth field may indicate an azimuth (e.g., recommended azimuth) of a signal (e.g., frame), and the azimuth accuracy field may indicate an accuracy of the azimuth indicated by the AOA azimuth field. The AOA elevation field may indicate an elevation (e.g., recommended elevation) of a signal, and the elevation accuracy field may indicate an accuracy of an elevation indicated by the AOA elevation field.

Meanwhile, information element(s) for communications in the second link may be transmitted as information element(s) of an unsolicited neighbor report. In this case, a BSSID may be set to a wildcard BSSID that is a BSSID set for OCB, and an unused field may be configured as a reserved field. In addition, the broadcast field, the channel switch time field, and the field indicating whether a channel measurement procedure is required may be indicated by reserved bit(s) in a BSSID information field among the information element(s) of the neighbor report.

In this case, when the neighbor report is received, the BSSID field indicates a wildcard BSSID, and a channel in the second link is indicated, the MLD may determine that the received information element(s) are information element(s) for announcing data transmission using the second link. In addition, the MLD may identify the information element(s) included in the BSSID field. The direction information field (e.g., field indicating a transmission direction and/or a reception direction) may be included in the neighbor report as an additional sub-information element. The additional sub-information element indicating the transmission direction and/or the reception direction may have a form in which a sub information element ID and a length field are added to an existing field.

Figure 14:
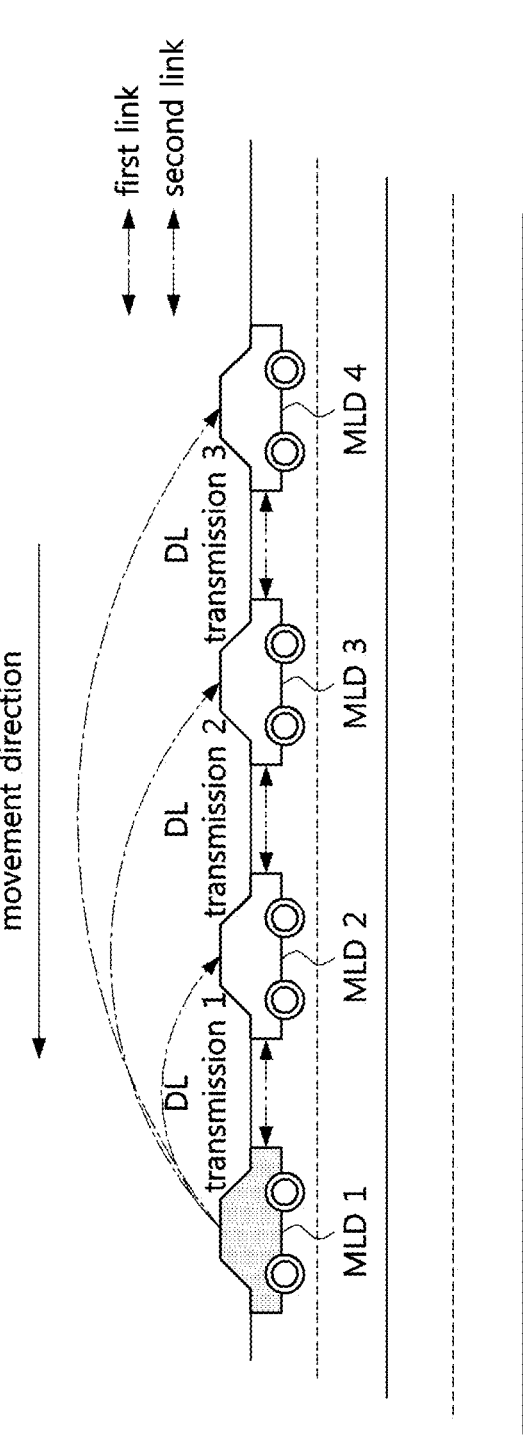
FIG. 14 is a conceptual diagram illustrating a first embodiment of a communication method using a second link in a wireless LAN system.

FIG. 14 is a conceptual diagram illustrating a first embodiment of a communication method using a second link in a wireless LAN system.

As shown in FIG. 14, MLDs may perform communication using the second link. The MLDs may be located in vehicles, and the vehicles may move at regular intervals. For example, the vehicles may form a platooning group. The MLD 1 located in the first vehicle among the vehicles may control communications of other MLDs. Communication between the MLD n and the MLD n+1 may be performed. Here, n may be a natural number. For example, the MLD n may receive a frame from the MLD n+1, and the MLD n+1 may receive a frame from the MLD n. The frame (e.g., data frame) may be transmitted in a broadcast scheme or a unicast scheme. The frame may be transmitted through the first link or the second link. A frame including large-capacity data (e.g., video data) may be transmitted using the second link.

A signal (e.g., frame) of the second link may have directionality. When a frame is transmitted/received using the second link, a communication operation may be performed individually for each MLD due to the directionality of the second link. In the wireless LAN system shown in FIG. 14, the probe step, the authentication step, and the association step may not be performed. MLDs that do not belong to a specific BSS may transmit/receive data. In other words, the MLDs may transmit and receive data in the OCB scheme. Accordingly, the AP may not periodically transmit beacon frames.

When the data transmission operation between the MLD 1 and the MLD 2 is performed in the second link, a negotiation procedure may be performed before the data transmission operation using the second link due to the directionality of the second link. The negotiation procedure for using the second link may be performed in the first link.

Figure 15:
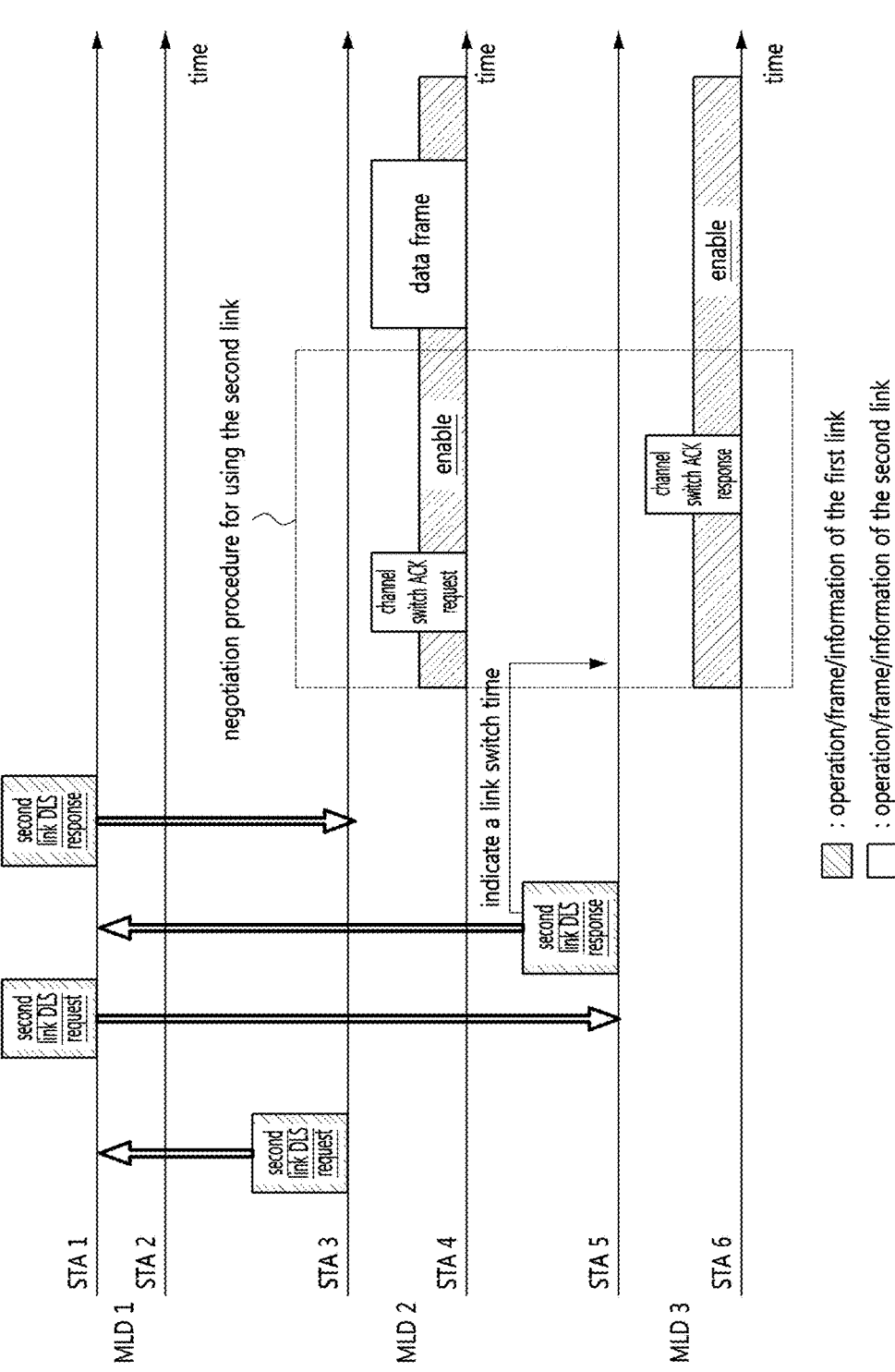
FIG. 15 is a timing diagram illustrating a fifth embodiment of a negotiation procedure for using a second link in a wireless LAN system.

FIG. 15 is a timing diagram illustrating a fifth embodiment of a negotiation procedure for using a second link in a wireless LAN system.

As shown in 15, STAs 1 and 2 may be STAs affiliated with the MLD 1, STAs 3 and 4 may be STAs affiliated with the MLD 2, and STAs 5 and 6 may be STAs affiliated with the MLD 3. Here, the STA may be an AP or a non-AP STA. Each of the MLD 1, MLD 2, and MLD 3 shown in FIG. 15 may be the MLD 1, MLD 2, and MLD 3 located in the vehicles shown in FIG. 14. The MLD 1 may control communication operations of other MLDs (e.g., MLD 2 and MLD 3). The MLD 1 may perform a negotiation procedure for using the second link with each of the MLD 2 and MLD 3.

The MLD (e.g., STA) may transmit information requesting to perform a data transmission operation (e.g., communication operation) using the second link in the first link. The information requesting to perform a data transmission operation using the second link may be included in a second link direct link setup (DLS) request frame. For example, the MLD 2 (e.g., STA3) may transmit a second link DLS request frame to the MLD 1 in the first link. The MLD 1 (e.g., STA1) may receive the second link DLS request frame from the MLD 2 and may determine that the MLD 2 has requested to perform a data transmission operation in the second link based on information element(s) included in the second link DLS request frame. The MLD 1 may transmit a second link DLS request frame to the MLD 3 in the first link.

The MLD 3 (e.g., STA 5) may receive the second link DLS request frame from the MLD 1 and may determine that a previous MLD (e.g., MLD 1 and/or MLD2) has requested to perform a data transmission operation in the second link based on information element(s) included in the second link DLS request frame. The MLD 3 may transmit a second link DLS response frame to the MLD 1 through the first link in response to the second link DLS request frame. By transmitting and receiving the second link DLS response frame, information element(s) for communications in the second link may be determined.

The MLD 1 may receive the second link DLS response frame from the MLD 3 in the first link, identify information element(s) included in the second link DLS response frame, and transmit the second link DLS response frame to the MLD 2. In other words, the MLD 1 may identify that communications between the MLD 2 and the MLD 3 are performed in the second link based on the information element(s) included in the second link DLS response frame. The MLD 2 may receive the second link DLS response frame from the MLD 1 in the first link, identify the information element(s) included in the second link DLS response frame, and determine information element(s) for communications in the second link.

Each of the second link DLS request frame and the second link DLS response frame may include channel information of the second link, a use time (e.g., link switch time) of the second link, a return time of the first link, a type of an MLD transmitting the second link DLS request frame, a type of an MLD transmitting the second link DLS response frame, and/or a type of data to be transmitted in the second link. In addition, each of the second link DLS request frame and the second link DLS response frame may further include information indicating a data transmission time in the second link. The return time of the first link may indicate a time of switching from the second link to the first link when communication using the second link fails. The type of the MLD transmitting the second link DLS request frame and/or the second link DLS response frame may indicate an MLD initiating a channel measurement procedure for configuring a transmission direction of the second link or an MLD supporting a channel measurement procedure initiated by another MLD.

The second link DLS request frame may be the same as or similar to a tunneled direct link setup (TDLS) request frame. The second link DLS response frame may be the same as or similar to a TDLS response frame. When a signal (e.g., frame) is transmitted in a preconfigured direction in the second link, the second link DLS request frame and/or the second link DLS response frame may further include information indicating the transmission direction of the signal. In addition, the second link DLS request frame and/or the second link DLS response frame may further include information indicating whether a channel measurement procedure for configuring a transmission direction is required.

When the link switch time elapses after the procedure of exchanging the second link DLS request/response frames is completed, whether communications in the second link are possible may be identified by exchanging the channel switch ACK request/response frames. A power saving (PS)-Poll frame, an unscheduled-automatic power save delivery (U-APSD) frame, or a QoS-Null frame may be used instead of the channel switch ACK request frame and/or the channel switch ACK response frame. In this case, the channel switch ACK request frame and the channel switch ACK response frame may be arbitrary frames.

Alternatively, when a channel measurement procedure for configuring a transmission direction is required, a frame for the channel measurement procedure may be transmitted instead of the channel switch ACK request frame. In other words, the channel measurement procedure for configuring a transmission direction between the MLDs may be performed instead of the procedure of identifying whether communications in the second link are possible. After the exchange of the frames for the channel measurement procedure is completed, the MLDs may perform communications using an indicated channel of the second link. On the other hand, if the procedure of exchanging the channel switch ACK request/response frames is not performed for a preset time, the MLDs may perform communications in the first link after the return time indicated by the second link DLS request frame and/or the second link DLS response frame and may perform a renegotiation procedure for using the second link.

Meanwhile, the MLD 1 may transmit a data frame (e.g., frame including video data) in a broadcast scheme. Alternatively, the data frame may be sequentially transmitted up to the MLD 4 located in the last vehicle among the vehicles shown in FIG. 14. When large-capacity data is to be transmitted using the second link, the data frame (e.g., frame including large-capacity data) may be sequentially transmitted in the second link due to the straightness of the signal in the second link. Accordingly, the second link may be sequentially configured from the first MLD (e.g., MLD 1) to the last MLD (e.g., MLD 4). When the second link is sequentially configured, communications using the second link may be configured at once through the following operation.

Figure 16A:
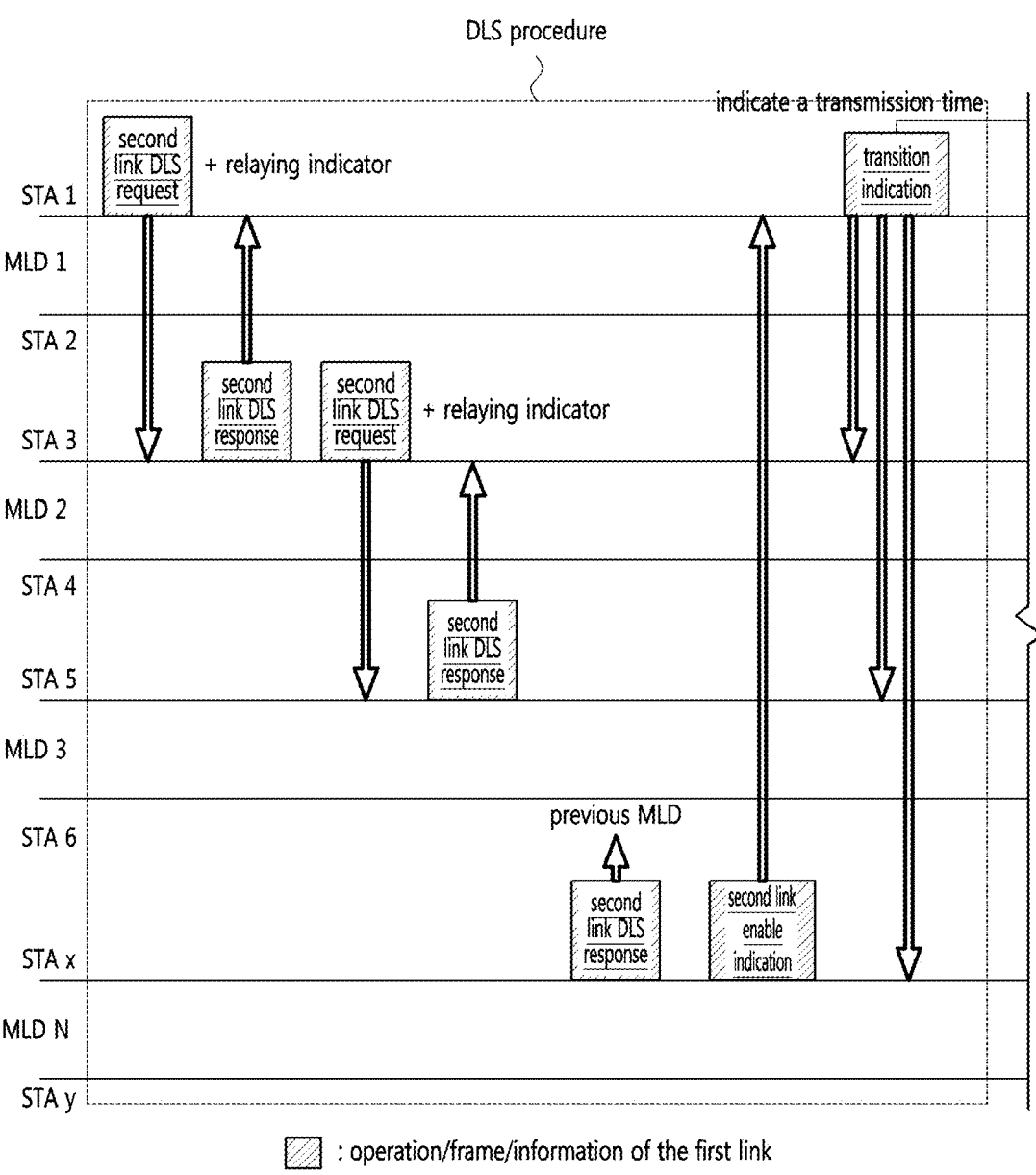
FIGS. 16A and 16B are timing diagrams illustrating a sixth embodiment of a negotiation procedure for using a second link in a wireless LAN system.
Figure 16B:
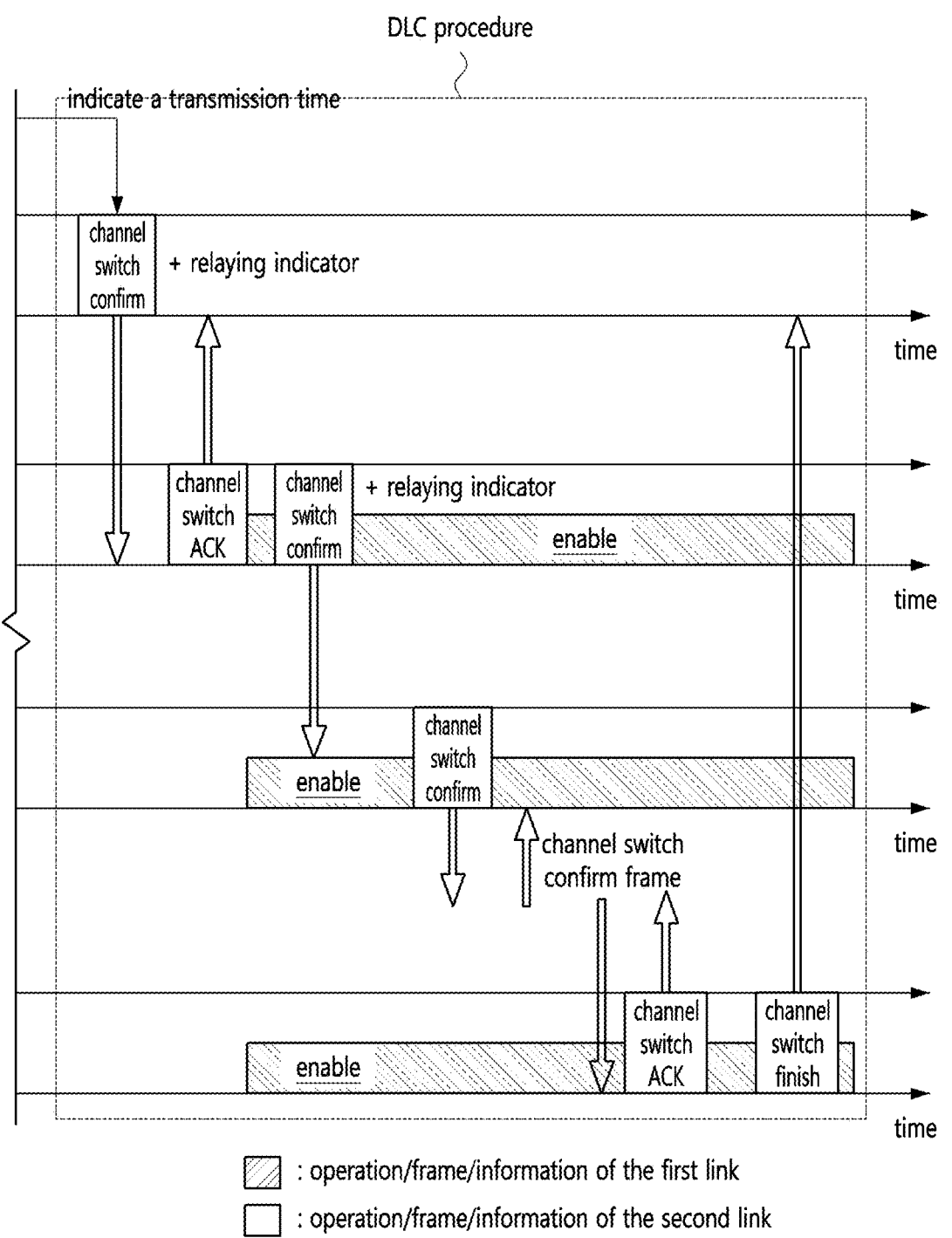

FIGS. 16A and 16B are timing diagrams illustrating a sixth embodiment of a negotiation procedure for using a second link in a wireless LAN system. The operation shown in FIG. 16B may be performed after the operation shown in FIG. 16A. In other words, the operations shown in FIGS. 16A and 16B may be continuously performed.

As shown in FIGS. 16A and 16B, STAs 1 and 2 may be STAs affiliated with the MLD 1, STAs 3 and 4 may be STAs affiliated with the MLD 2, STAs 5 and 6 may be STAs affiliated with the MLD 3, and STAs x and y may be STAs affiliated with the MLD N. Each of x, y, and N may be a natural number. Here, the STA may be an AP or a non-AP STA. The MLD 1 may control communication operations of other MLDs. A communication operation using the second link may be configured such that all neighboring MLDs receive a frame (e.g., data frame) from the MLD 1.

The neighboring MLDs may sequentially perform a negotiation procedure for using the second link by exchanging frames for the negotiation procedure in the first link. The operation using the second link may be negotiated at once. The MLD 1 may transmit a second link DLS request frame to the MLD 2 in the first link. The MLD 2 may receive the second link DLS request frame from the MLD 1 in the first link and may transmit a second link DLS response frame to the MLD 1 in response to the second link DLS request frame. The MLD 1 may receive the second link DLS response frame from the MLD 2 in the first link. By performing the procedure of exchanging the second link DLS request/response frames, the MLDs 1 and 2 may determine information elements for communications in the second link.

Each of the second link DLS request frame and the second link DLS response frame may include channel information of the second link, a use time (e.g., link switch time) of the second link, a return time of the first link, a type of an MLD transmitting the second link DLS request frame, a type of an MLD transmitting the second link DLS response frame, a type of data to be transmitted in the second link, and/or information indication whether to perform link configuration using the second link (e.g., communication operation configuration) (hereinafter, referred to as 'relaying indicator'). In addition, each of the second link DLS request frame and the second link DLS response frame may further include information indicating a data transmission time in the second link. The return time of the first link may indicate a time of switching from the second link to the first link when communications using the second link fail. The type of an MLD transmitting the second link DLS request frame and/or the second link DLS response frame may indicate an MLD initiating a channel measurement procedure for configuring a transmission direction of the second link or may indicate an MLD supporting a channel measurement procedure initiated by another MLD.

The second link DLS request frame may be the same as or similar to a TDLS request frame. The second link DLS response frame may be the same as or similar to a TDLS response frame. When a signal (e.g., frame) is transmitted in a preconfigured direction in the second link, the second link DLS request frame and/or the second link DLS response frame may further include information indicating the transmission direction of the signal. In addition, the second link DLS request frame and/or the second link DLS response frame may further include information indicating whether a channel measurement procedure for configuring a transmission direction is required.

When the procedure of exchanging the second link DLS request/response frames between the MLD 1 and the MLD 2 is completed, the MLD 2 may perform a procedure of exchanging the second link DLS request/response frames with the MLD 3. In this case, information element(s) included in the second link DLS request frame transmitted from the MLD 2 to the MLD 3 may be the same as the information element(s) negotiated in the procedure of exchanging the second link DLS request/response frames between the MLD 1 and the MLD 2. The procedure of exchanging the second link DLS request/response frames between the MLD 2 and the MLD 3 may be performed identically or similarly to the procedure of exchanging the second link DLS request/response frames between the MLD 1 and the MLD 2. The procedures of exchanging the second link DLS request/response frames between the neighboring MLDs may be sequentially performed. When the procedures of exchanging the second link DLS request/response frames for all MLDs are completed, the following operations may be performed.

When the procedure of exchanging the second link DLS request/response frames for the last MLD (e.g., MLD N) is completed, the MLD N may transmit, to the MLD 1, a second link enable indication frame indicating that the procedures for exchanging the second link DLS request/response frames for the first MLD (e.g., MLD1) to the last MLD (e.g., MLD N) have been completed through the first link. The MLD 1 may receive the second link enable indication frame from the MLD N in the first link. In this case, the MLD 1 may determine that all neighboring MLDs have completed the procedures of exchanging the second link DLS request/response frames. Accordingly, the MLD 1 may transmit a transition indication frame indicating use of the second link. The transition indication frame may be transmitted in a broadcast scheme. The transition indication frame may include information indicating a link switch time and information indicating a return time.

When the DLS procedure has been completed or when the link switch time indicated by the transition indication frame has passed, a procedure of confirming whether to operate in the second link (hereinafter referred to as 'direct link confirmation (DLC) procedure') may be performed. The DLC procedure may be performed by exchanging a channel switch confirm frame and a channel switch ACK frame in the second link. For example, the MLD n may transmit a channel switch confirm frame to the MLD n+1 in the second link. The MLD n+1 may receive the channel switch confirm frame from the MLD n in the second link and may transmit a channel switch ACK frame to the MLD n through the second link in response to the channel switch confirm frame. The MLD n may receive the channel switch ACK frame from the MLD n+1 in the second link. n may be a natural number.

The channel switch confirm frame and the channel switch ACK frame may be arbitrary frames. The channel switch confirm frame may further include a relaying indicator. The relaying indicator may indicate whether the corresponding channel switch confirm frame is reused in a subsequent DLC procedure. The DLC procedure may be performed similarly to the above-described DLS procedure. The DLC procedure between the first MLD and the second MLD may be performed. When the DLC procedure between the first MLD and the second MLD is completed, the DLC procedure between the second MLD and the third MLD may be performed. The DLC procedure may be sequentially performed up to the last MLD.

After transmitting the channel switch ACK frame, the last MLD (e.g., MLD N) may transmit a channel switch finish frame indicating that the DLC procedures of all neighboring MLDs have been completed to the MLD 1 through the second link. For example, when the relaying indicator included in the channel switch confirm frame indicates that the corresponding channel switch confirm frame is not reused (or the channel switch confirm frame does not include the relaying indicator), the MLD receiving the corresponding channel switch confirm frame may determine that it is the last MLD. In this case, the last MLD may transmit a channel switch finish frame to the MLD 1 after completing the DLC procedure.

Due to the straightness of the signal (e.g., frame), the channel switch finish frame may not be transmitted directly from the MLD N to the MLD 1. In this case, the channel switch finish frame may be transmitted in a relaying scheme. Accordingly, all MLDs may receive the channel switch finish frame and accordingly may determine that the DLC procedures have been completed. In other words, all MLDs may determine that communication operations in the second link are possible.

On the other hand, a specific MLD may not be able to transmit the channel switch ACK frame. In this case, an MLD that has not received the channel switch ACK frame may retransmit the channel switch confirm frame. If the channel switch finish frame is not received until the return time, the MLD 1 may perform a communication operation in the first link after the return time and may perform a renegotiation procedure for using the second link. When the DLC procedure is completed, the communication operation using the second link may be performed identically or similarly to the above-described DLC procedure.

Figure 17A:
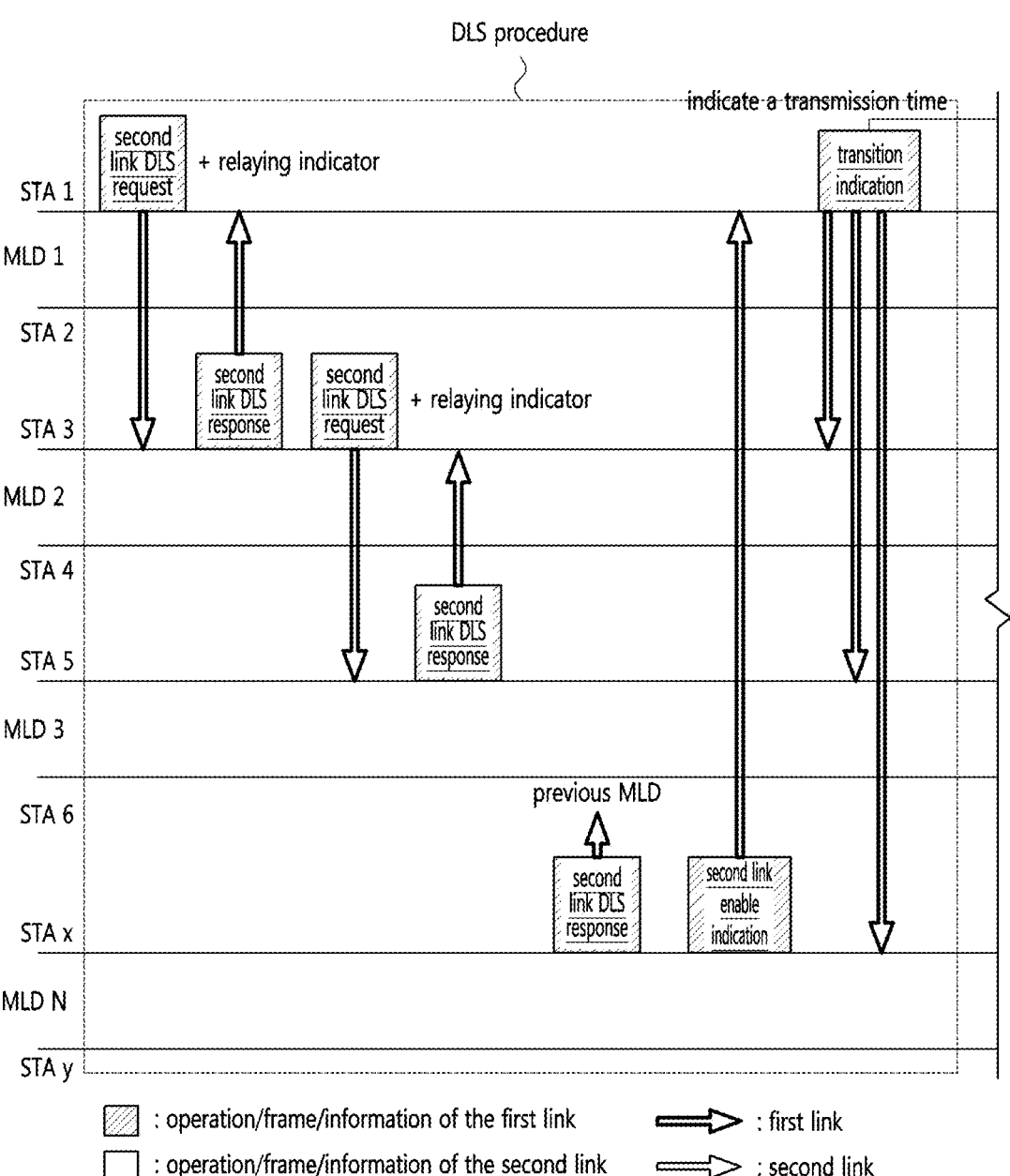
FIGS. 17A and 17B are timing diagrams illustrating a seventh embodiment of a negotiation procedure for using a second link in a wireless LAN system.
Figure 17B:
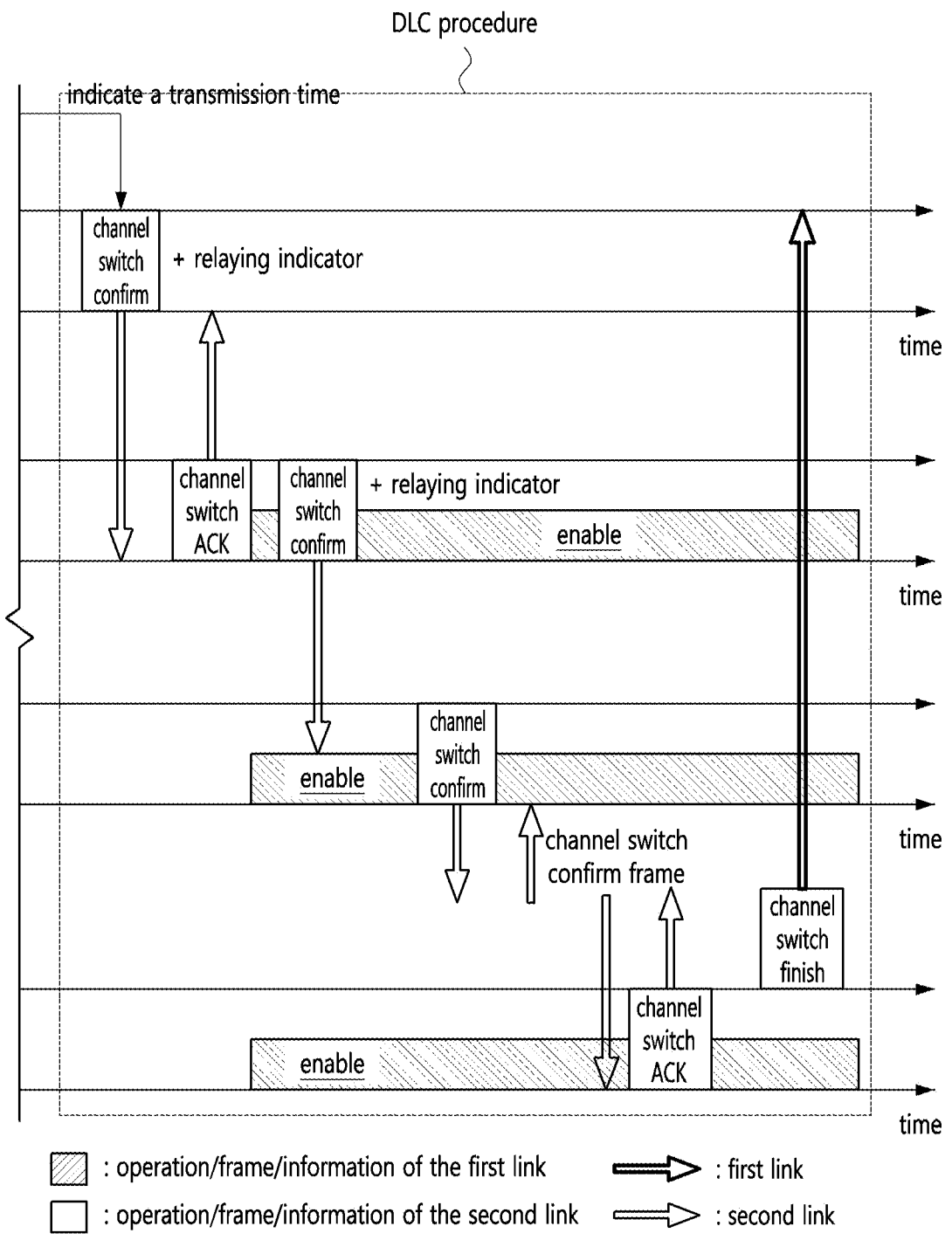

FIGS. 17A and 17B are timing diagrams illustrating a seventh embodiment of a negotiation procedure for using a second link in a wireless LAN system. The operation shown in FIG. 17B may be performed after the operation shown in FIG. 17A. In other words, the operations shown in FIGS. 17A and 17B may be continuously performed.

As shown in FIGS. 17A and 17B, STAs 1 and 2 may be STAs affiliated with the MLD 1, STAs 3 and 4 may be STAs affiliated with the MLD 2, STAs 5 and 6 may be STAs affiliated with the MLD N. Each of x, y, and N may be a natural number. Here, the STA may be an AP or a non-AP STA. The MLD 1 may control communication operations of other MLDs. A communication operation using the second link may be configured such that all neighboring MLDs receive a frame (e.g., data frame) from the MLD 1.

After the DLS procedure is completed, the DLC procedure may be performed. The DLS procedure shown in FIG. 17A may be the same as the DLS procedure shown in FIG. 16A, and the DLC procedure shown in FIG. 17B may be the same as the DLC procedure shown in FIG. 16B except that the link through which the channel switch finish frame is transmitted is different. When it is determined that the DLC procedures of all MLDs have been completed, the last MLD (e.g., MLD N) may transmit a channel switch finish frame to the MLD 1 through the first link after transmitting a channel switch ACK frame. The channel switch finish frame may be transmitted to the MLD 1 in a unicast scheme. Alternatively, the channel switch finish frame may be transmitted in a broadcast scheme.

On the other hand, a specific MLD may not be able to transmit the channel switch ACK frame. In this case, the MLD that has not received the channel switch ACK frame may retransmit the channel switch confirm frame. If the channel switch finish frame is not received until the return time, the MLD 1 may perform a communication operation in the first link after the return time and may perform a renegotiation procedure for using the second link.

Figure 18A:
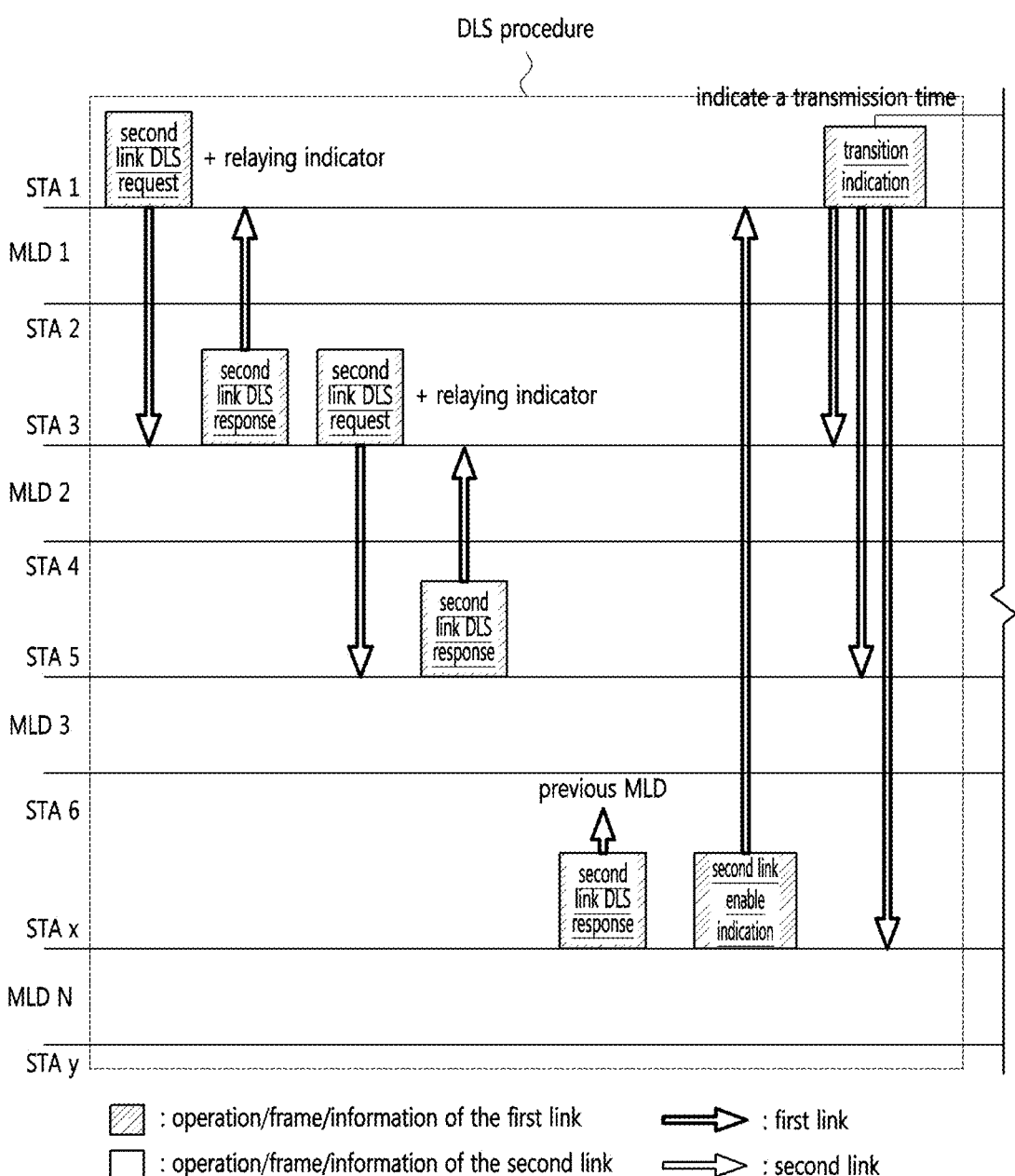
FIGS. 18A and 18B are timing diagrams illustrating an eighth embodiment of a negotiation procedure for using a second link in a wireless LAN system.
Figure 18B:
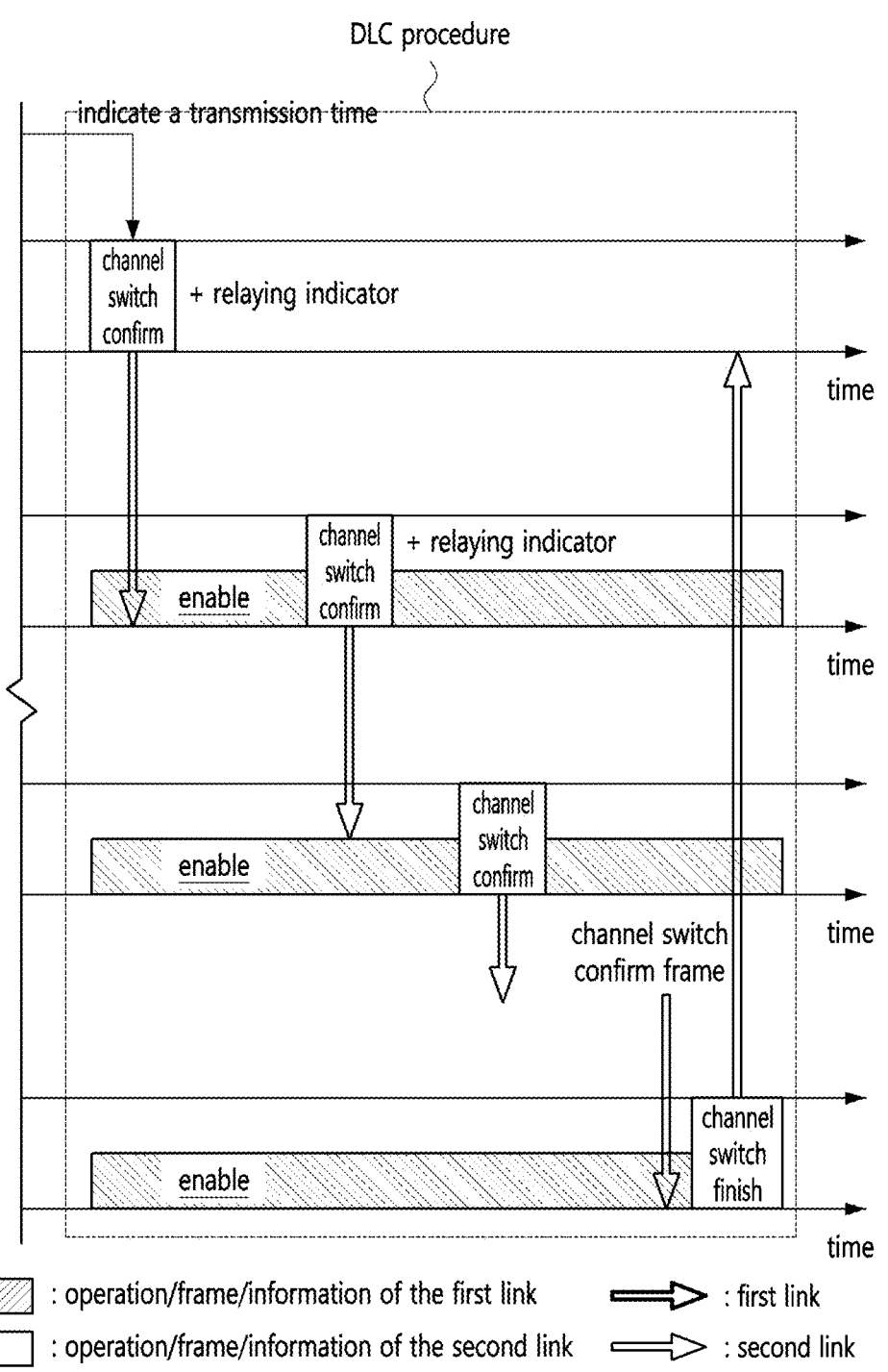

FIGS. 18A and 18B are timing diagrams illustrating an eighth embodiment of a negotiation procedure for using a second link in a wireless LAN system. The operation shown in FIG. 18B may be performed after the operation shown in FIG. 18A. In other words, the operations shown in FIGS. 18A and 18B may be continuously performed.

As shown in FIGS. 18A and 18B, STAs 1 and 2 may be STAs affiliated with the MLD 1, STAs 3 and 4 may be STAs affiliated with the MLD 2, STAs 5 and 6 may be STAs affiliated with the MLD 3, and STAs x and y may be STAs affiliated with the MLD N. Each of x, y, and N may be a natural number. Here, the STA may be an AP or a non-AP STA. The MLD 1 may control communication operations of other MLDs. A communication operation using the second link may be configured such that all neighboring MLDs receive a frame (e.g., data frame) from the MLD 1.

After the DLS procedure is completed, the DLC procedure may be performed. The DLS procedure shown in FIG. 18A may be the same as the DLS procedure shown in FIG. 16A. The DLC procedure may be performed when the DLS procedure has been completed or w % ben the link switch time has passed. The DLC procedure may be performed by transmitting a single frame (e.g., channel switch confirm frame). The channel switch confirm frame may bean arbitrary frame. The channel switch confirm frame may further include a relaying indicator. The relaying indicator may indicate whether the channel switch confirm frame is reused in a subsequent DLC procedure.

The first MLD (e.g., MLD 1) may transmit a channel switch confirm frame to the second MLD (e.g., MLD 2) in the second link. The MLD 2 may receive the channel switch confirm frame from the MLD 1. When the channel switch confirm frame received from the MLD 1 is reused in the DLC procedure between the MLD 2 and the MLD 3, the MLD 2 may transmit the channel switch confirm frame to the MLD 3 through the second link. The above-described DLC procedure may be performed until the last MLD (e.g., MLD N) receives the channel switch confirm frame.

The last MLD (e.g., MLD N) receiving the channel switch confirm frame may transmit a channel switch ACK frame through the second link in response to the channel switch confirm frame. Due to the straightness of the signal (e.g., frame), the channel switch ACK frame may not be transmitted directly from the MLD N to the MLD 1. In this case, the channel switch ACK frame may be transmitted in a relaying scheme. For example, the MLD n+1 may transmit the channel switch ACK frame to the MLD n, and the MLD n may transmit the channel switch ACK frame received from the MLD n+1 to the MLD n−1. In this case, all MLDs may receive the channel switch ACK and thus may determine that communication operations in the second link are possible.

Meanwhile, the MLD 1 may not receive the channel switch ACK frame within a preset time. In this case, the MLD 1 may not know the MLD that has not received the channel switch confirm frame. Therefore, the MLD 1 may perform the DLC procedure again by retransmitting the channel switch confirm frame. Alternatively, if the channel switch ACK frame is not received until the return time, the MLD 1 may perform a communication operation in the first link after the return time and may perform a renegotiation procedure for using the second link. When the DLC procedure is completed, the communication operation using the second link may be performed identically or similarly to the above-described DLC procedure.

Figure 19A:
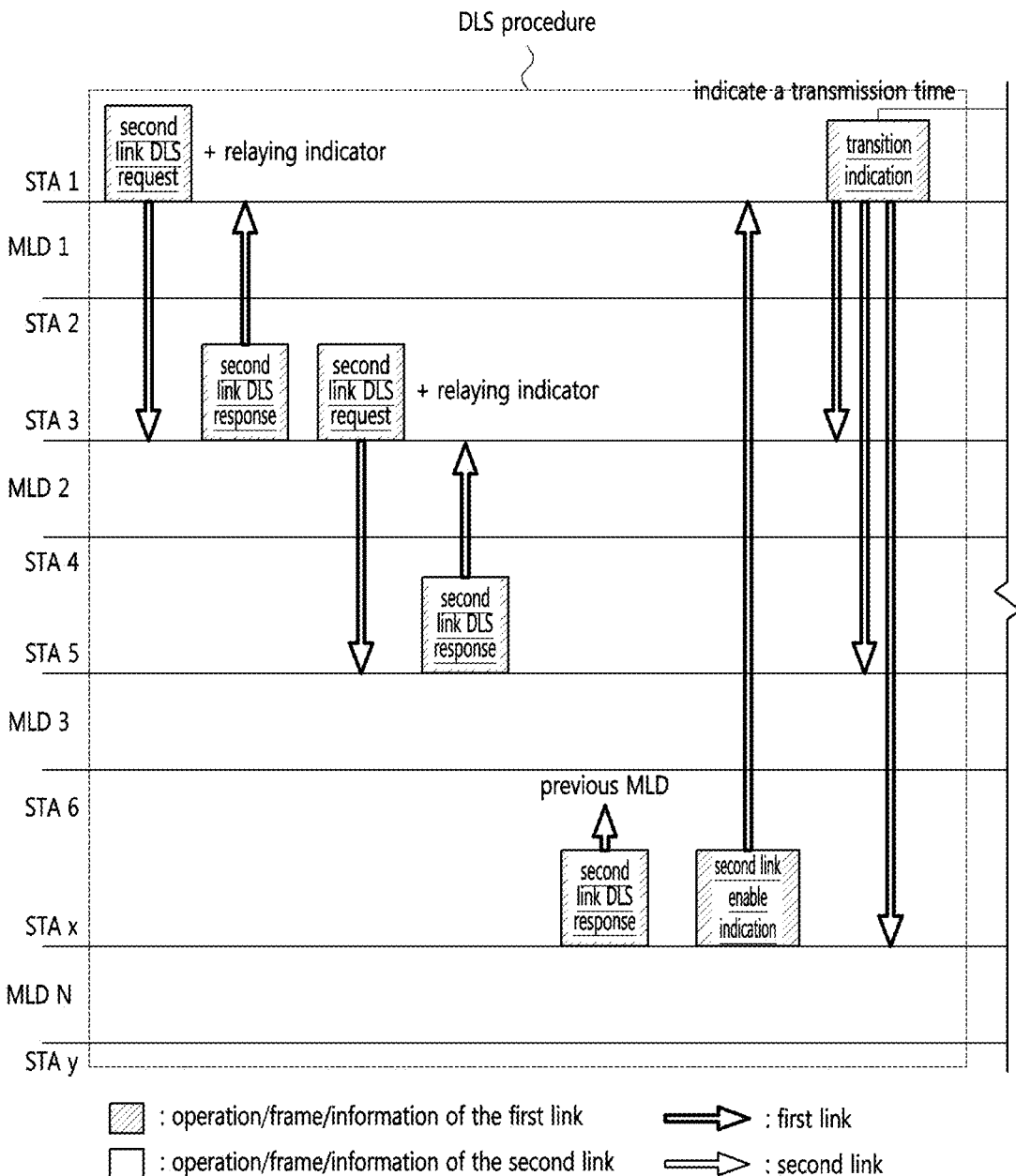
FIGS. 19A and 19B are timing diagrams illustrating a ninth embodiment of a negotiation procedure for using a second link in a wireless LAN system.
Figure 19B:
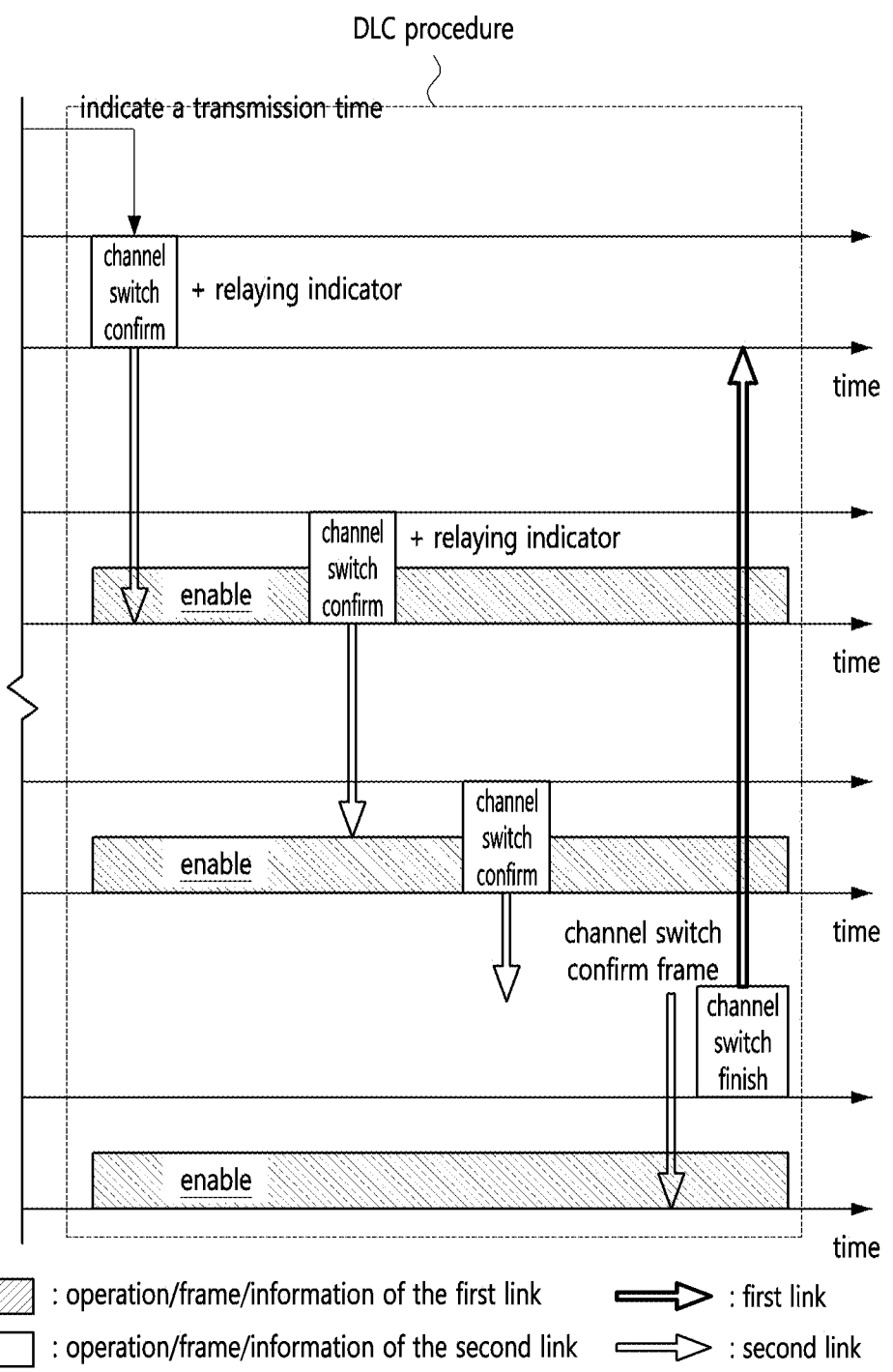

FIGS. 19A and 19B are timing diagrams illustrating a ninth embodiment of a negotiation procedure for using a second link in a wireless LAN system. The operation shown in FIG. 19B may be performed after the operation shown in FIG. 19A. In other words, the operations shown in FIGS. 19A and 19B may be continuously performed.

As shown in FIGS. 19A and 19B, STAs 1 and 2 may be STAs affiliated with the MLD 1, STAs 3 and 4 may be STAs affiliated with the MLD 2, STAs 5 and 6 may be STAs affiliated with the MLD 3, and STAs x and y may be STAs affiliated with the MLD N. Each of x, y, and N may be a natural number. Here, the STA may be an AP or a non-AP STA. The MLD 1 may control communication operations of other MLDs. A communication operation using the second link may be configured such that all neighboring MLDs receive a frame (e.g., data frame) from the MLD 1.

After the DLS procedure is completed, the DLC procedure may be performed. The DLS procedure shown in FIG. 19A may be the same as the DLS procedure shown in FIG. 16A, and the DLC procedure shown in FIG. 19B may be the same as the DLC procedure shown in FIG. 18B except that the link through which the channel switch ACK frame is transmitted is different. For example, the last MLD (e.g., MLD N) receiving the channel switch confirm frame may transmit a channel switch ACK frame to the MLD 1 through the first link. The channel switch ACK frame may be transmitted to the MLD 1 in a unicast scheme. Alternatively, the channel switch ACK frame may be transmitted in a broadcast scheme.

Meanwhile, the MLD 1 may not receive the channel switch ACK frame within a preset time. In this case, the MLD 1 may not know the MLD that has not received the channel switch confirm frame. Therefore, the MLD 1 may perform the DLC procedure again by retransmitting the channel switch confirm frame. Alternatively, if the channel switch ACK frame is not received until the return time, the MLD 1 may perform a communication operation in the first link after the return time and may perform a renegotiation procedure for using the second link.

Meanwhile, the channel measurement procedure for configuring a transmission direction may be performed separately from the embodiments shown in FIGS. 16 to 19. In this case, an operation of an MLD initiating the channel measurement procedure and/or an operation of changing the MLD 1 controlling the communication operations in the second link may be performed as follows.

Figure 20:
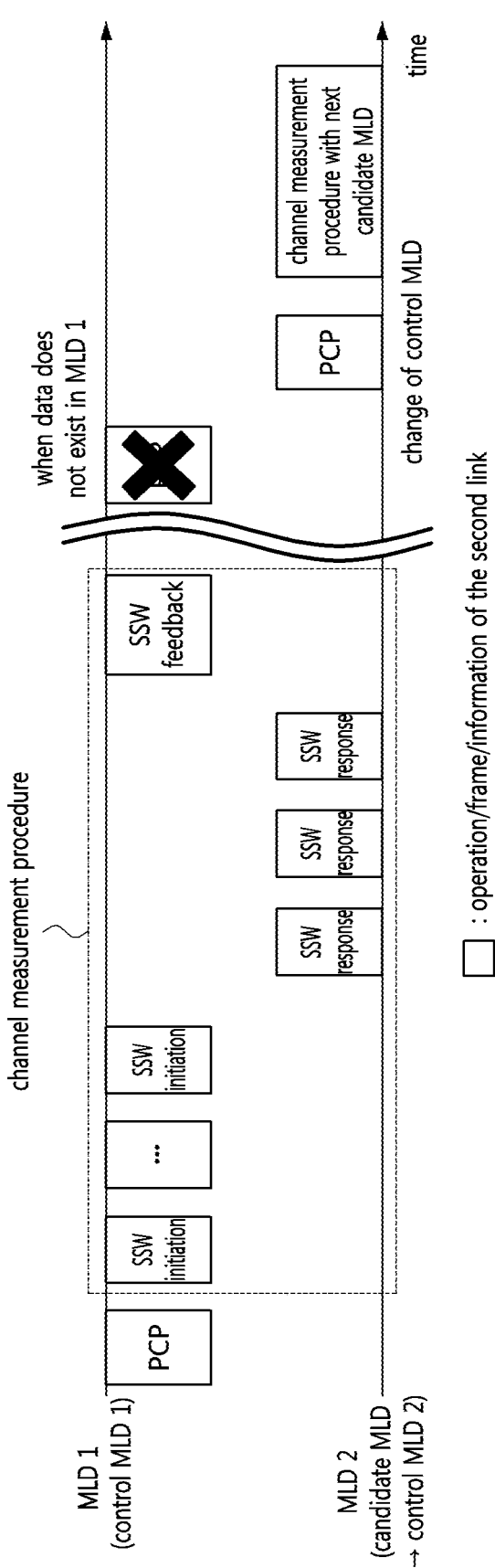
FIG. 20 is a timing diagram illustrating a first embodiment of a method of changing an MLD controlling a communication operation in a wireless LAN system.

FIG. 20 is a timing diagram illustrating a first embodiment of a method of changing an MLD controlling a communication operation in a wireless LAN system.

As shown in FIG. 20, the MLD 1 may perform a communication operation in the second link and may control communication operations in the second link. An MLD that controls communication operations in the second link may be referred to as 'control MLD'. The MLD 1 (e.g., control MLD 1) may transmit a personal basic service set (PBSS) control point (PCP) frame including a list of candidate MLDs for controlling the communication operations in the second link. The candidate MLD list may include information (e.g., identifier, address) of one or more candidate MLDs that will control the communication operations in the second link after the control MLD 1. The PCP frame may be transmitted periodically.

The control MLD 1 may perform a channel measurement procedure for transmission direction configuration with a candidate MLD belonging to the candidate MLD list. In addition, the control MLD 1 may perform a communication operation in the second link. When data (e.g., frame) to be transmitted through the second link does not exist in the control MLD 1, the control MLD 1 may not transmit the PCP frame in a transmission period of the PCP frame. A candidate MLD belonging to the candidate MLD list (e.g., the candidate MLD performing the channel measurement procedure with the control MLD 1) may not be able to receive the PCP frame from the control MLD 1 within a preset time (e.g., time according to the transmission period of the PCP frame). In this case, the candidate MLD may determine that data to be transmitted in the second link does not exist in the MLD 1 and thus may operate as an MLD (e.g., control MLD 2) that controls communication operations in the second link.

The control MLD 2 may generate a candidate MLD list including one or more candidate MLDs excluding the MLD 1 (e.g., control MLD 1) and may transmit a PCP frame including the candidate MLD list. The PCP frame may be transmitted periodically. The control MLD 2 may perform a channel measurement procedure for transmission direction configuration with another candidate MLD belonging to the candidate MLD list.

Meanwhile, the PCP frame including the candidate MLD list may be transmitted in a broadcast scheme. The PCP frame may be repeatedly transmitted in different directions. Alternatively, the PCP frame including the candidate MLD list may be transmitted in the first link so that neighboring MLDs identify the candidate MLD list. When an operation of changing the control MLD is performed, all MLDs (e.g., MLDs from the first MLD to the last MLD) may perform a channel measurement procedure for transmission direction configuration. In other words, each of all MLDs may continuously perform the channel measurement procedure. The PCP frame including the candidate MLD list may be configured as follows.

Figure 21:
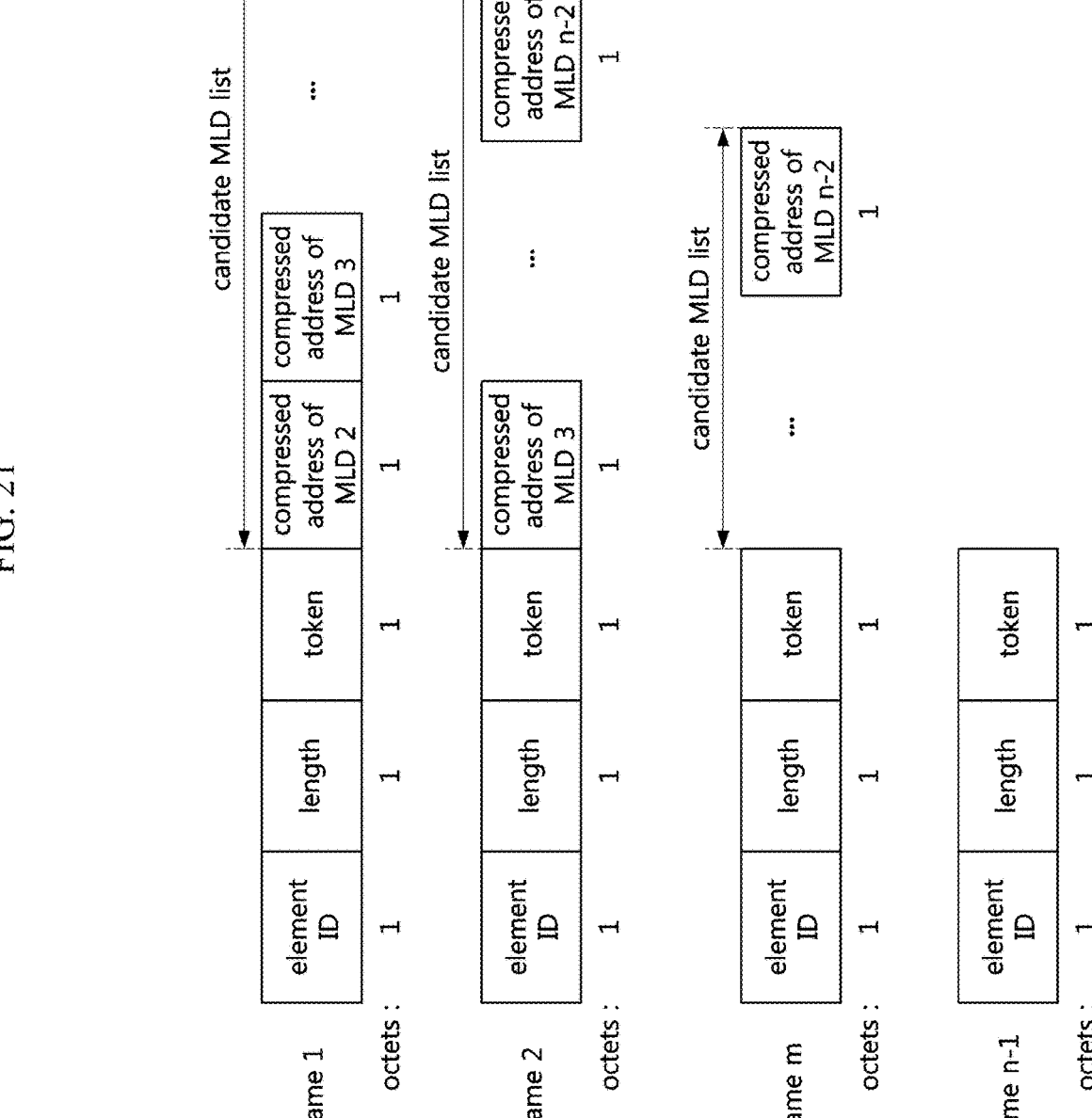
FIG. 21 is a conceptual diagram illustrating a first embodiment of a PCP (personal basic service set (PBSS) control point) frame in a wireless LAN system.

FIG. 21 is a conceptual diagram illustrating a first embodiment of a PCP frame in a wireless LAN system.

As shown in FIG. 21, a PCP frame may include an element ID field, a length field, a token field, and a candidate MLD list field. The candidate MLD list field may include compressed addresses of candidate MLDs. The wireless LAN system may include n MLDs. The MLD 1 may be the first MLD, and the MLD n may be the last MLD. Here, n may be a natural number.

The MLD 1 may control communication operations in the second link. In other words, the MLD 1 may operate as the control MLD 1. The control MLD 1 may transmit a PCP frame 1 including a candidate MLD list. The candidate MLD list of the PCP frame 1 may include address information of the MLD 2, address information of the MLD 3, and address information of all MLDs including the MLD n–1. In other words, the candidate MLD list may not include address information of the last MLD (e.g., MLD n). The order of the MLDs in the candidate MLD list (e.g., the order of address information of the MLDs) may be the order of the MLDs operating as the control MLD. The address information may be compressed address information. The control MLD 1 may perform a channel measurement procedure with the MLD 2 indicated by the first field in the candidate MLD list of the PCP frame 1.

Meanwhile, when there is no data to be transmitted in the second link, the control MLD 1 may not transmit the PCP frame 1. In this case, since the PCP frame 1 is not received from the control MLD 1 within a preset time, the MLD 2 may operate as the control MLD 2. Accordingly, the control MLD 2 may transmit a PCP frame 2 including a candidate MLD list. The candidate MLD list of the PCP frame 2 may include address information of the MLD 3 to address information of the MLD n−1. In other words, the candidate MLD list may not include address information of the MLD 2.

The above-described operations may be sequentially performed in the MLDs. A PCP frame n−1 transmitted by the control MLD n−1 may not include a candidate MLD list. In other words, the PCP frame n−1 may not indicate a next control MLD. The MLD n receiving the PCP frame n−1 not including a candidate MLD list may determine that it is the last MLD. The MLD n may perform a channel measurement procedure with the control MLD n−1. Thereafter, the MLD n may not operate as a control MLD. When the channel measurement procedures have been completed in all MLDs (e.g., n MLDs), the MLD n may transmit information indicating that the channel measurement procedures for transmission direction confirmation have been completed in the first link and/or the second link.

Figure 22:
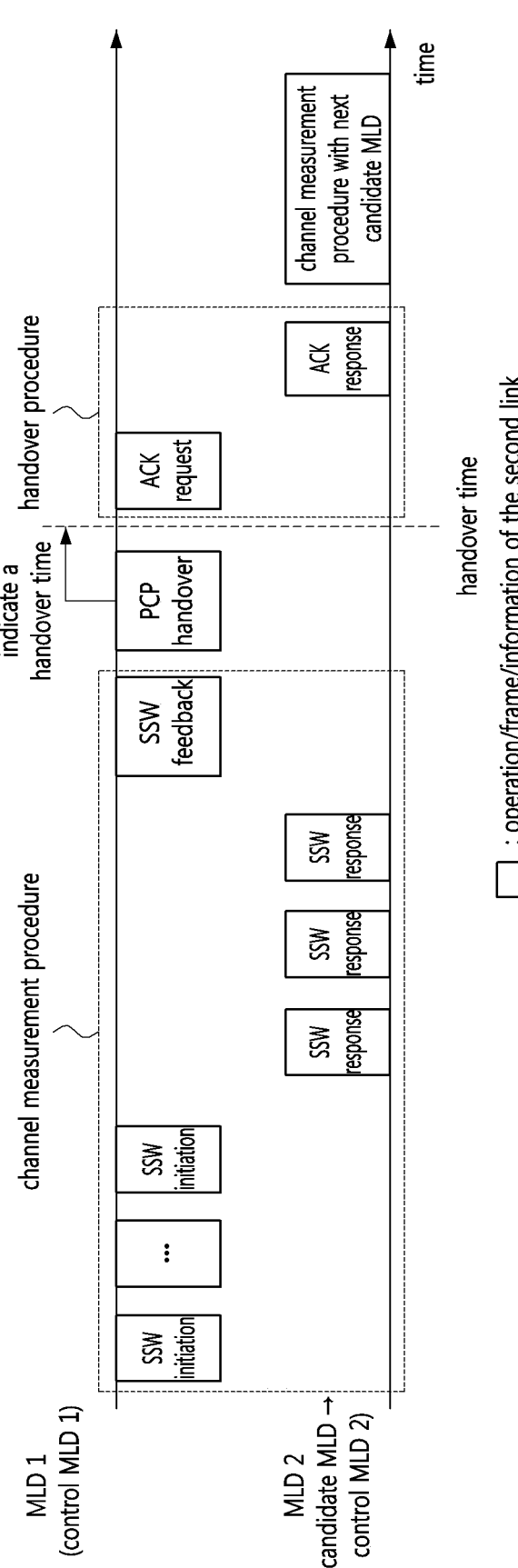
FIG. 22 is a timing diagram illustrating a second embodiment of a method of changing an MLD controlling a communication operation in a wireless LAN system.

FIG. 22 is a timing diagram illustrating a second embodiment of a method of changing an MLD controlling a communication operation in a wireless LAN system.

As shown in FIG. 22, the MLD 1 may perform a communication operation in the second link, and may control the communication operation in the second link. An MLD that controls the communication operation in the second link may be referred to as 'control MLD'. The control MLD may be changed by a separate frame and a negotiation procedure. The MLD 1 (e.g., control MLD 1) may perform a channel measurement procedure for transmission direction configuration with the MLD 2 (e.g., candidate MLD). The control MLD 1 may perform a data transmission operation in the second link. The embodiment shown in FIG. 22 may be performed after the embodiment shown in FIG. 20. For example, the embodiment shown in FIG. 22 may be performed after the PCP frame is transmitted/received. Alternatively, the embodiment shown in FIG. 22 may be performed independently of the embodiment shown in FIG. 20. When data to be transmitted in the second link does not exist in the control MLD 1, the control MLD 1 may transmit a PCP handover frame to a candidate MLD through the second link to designate the candidate MLD as a next control MLD.

The PCP handover frame may include address information of the candidate MLD (e.g., MLD 2 to operate as a control MLD), information on a time when the candidate MLD operates as a control MLD, and/or information on a time when the candidate MLD performs (e.g., controls) a communication operation. The time when the candidate MLD operates as the control MLD may refer to a handover time. The candidate MLD may receive the PCP handover frame from the control MLD 1 through the second link and may determine whether the address indicated by the PCP handover frame is the same as its own address. When the address indicated by the PCP handover frame is the same as the address of the candidate MLD, the candidate MLD may operate as a control MLD 2. The control MLD 2 may perform a communication operation using the second link at the time indicated by the PCP handover frame.

In addition, a procedure (hereinafter, referred to as a 'handover ACK procedure') for identifying whether the control MLD change procedure (e.g., handover procedure) has been successfully performed may be performed. In the handover ACK procedure, the MLD 1 (e.g., previous control MLD) that has transmitted the PCP handover frame may transmit an ACK request frame to the MLD 2 (e.g., current control MLD) in the second link. The ACK request frame may be used to identify whether the control MLD change procedure has been successfully completed. The MLD 2 may receive the ACK request frame from the MLD 1 in the second link. When the control MLD change procedure has been successfully completed, the MLD 2 may transmit an ACK response frame to the MLD 1 through the second link in response to the ACK request frame. When the ACK response frame is received from the MLD 2, the MLD 1 may determine that the control MLD change procedure has been successfully completed.

After the control MLD change procedure is completed or after the handover ACK procedure is completed, the MLD 2 may perform functions of the control MLD. In other words, the MLD 2 may operate as the control MLD 2. The control MLD 2 may perform a channel measurement procedure for transmission direction configuration with a next candidate MLD.

Meanwhile, the PCP handover frame may be transmitted in a unicast scheme. Alternatively, the PCP handover frame may be transmitted in a broadcast scheme. In this case, the PCP handover frame may be repeatedly transmitted in different directions. In order to inform all neighboring MLDs of the MLD that is to operate as the control MLD, the PCP handover frame may be transmitted in the first link.

FIG. 23 is a conceptual diagram illustrating a first embodiment of a PCP handover frame in a wireless LAN system.

As shown in FIG. 23, the PCP handover frame may include an element ID field, a length field, an address field of a next control MLD, and a time synchronization function (TSF) offset field indicating a handover time of the control MLD. The PCP handover frame may be classified into a type 1-PCP handover frame and a type 2-PCP handover frame. The type 1-PCP handover frame may further include a previous BSSID field. In other words, the type 1-PCP handover frame may include an element ID field, a length field, a previous BSSID field, an address field of a next control MLD, and a TSF offset field.

The previous BSSID field may be set to a wildcard BSSID. The previous BSSID field set to the wildcard BSSID may indicate that the PCP handover frame is used for changing the control MLD. In addition, the previous BSSID field set to the wildcard BSSID may indicate that the PCP handover frame is transmitted in the OCB scheme. The handover time of the control MLD may be indicated by the TSF offset. The TSF offset may indicate a time from a transmission time (or reception time) of the PCP handover frame to the handover time of the control MLD. The TSF offset may be expressed in units of a time unit (TU) or μs. The size of the field indicating the handover time of the control MLD may be 1 octet.

When a separate parameter indicates that the PCP handover frame is used for changing the control MLD, the previous BSSID field may not be needed. Therefore, the type 2-PCP handover frame may not include the previous BSSID field. In the type 2-PCP handover frame, the TSF offset field may be disposed at the position of the previous BSSID field. In other words, the type 2-PCP handover frame may include an element ID field, a length field, a TSF offset field, an address field of a next control MLD, and a reserved field.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who have ordinary skill in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above hardware device can be configured to operate as at least one software module in order to perform the embodiments of the present disclosure, and vice versa.

While the embodiments of the present disclosure and their advantages have been described in detail, it should be understood that various changes, substitutions, and alterations may be made herein without departing from the scope of the present disclosure.

The invention claimed is:

1. A method for operating a first device supporting a multi-link including a first link and a second link in a wireless local area network (LAN) system, the method comprising:

receiving, by a first access point (AP) of the first device from a second device, a first frame on the first link;

in response to the first frame, transmitting, by the first AP of the first device to the second device, a second frame on the first link; and performing, by a second AP of the first device, a communication operation with the second device in the second link based on information in the second frame, wherein the first frame is related to multi-link communications, wherein the first frame includes an identifier of the second link, and wherein the second frame includes an information element indicating a target beacon transmission time (TBTT) for the second AP of the first device.

2. The method of claim 1, wherein the first frame further includes a capability information element of the second device through the first link, wherein the second frame is a response frame for the first frame.

3. The method of claim 2, wherein the first frame further includes an information element indicative of supporting the communication operation in the second link.

4. The method of claim 2, wherein the first frame comprises a probe request frame, an action frame, or a management frame.

5. The method of claim 1, wherein second frame includes system information of one or more STAs of the first device, and wherein each of the one or more STAs is an access point (AP) STA or a non-AP STA.

6. The method of claim 1, wherein the second frame comprises a probe response frame or a beacon frame.

7. A first device supporting a multi-link including a first link and a second link in a wireless local area network (LAN) system, the first device comprising:

at least one transceiver;

at least one memory configured to store instructions;

at least one processor operably coupled to the at least one memory and configured, by executing the instructions, to:

receive, from a second device, a first frame on the first link, in response to the first frame, transmit, to a second device, a second frame on the first link; and perform a communication operation with the second device in the second link based on information in the second frame, wherein the first frame is related to multi-link communications, wherein the first frame includes an identifier of the second link, and wherein the second frame includes an information element indicating a target beacon transmission time (TBTT) for a second access point (AP) of the first device.

8. The first device of claim 7, wherein the first frame further includes a capability information element of the second device through the first link, wherein the second frame is a response frame for the first frame.

9. The first device of claim 8, wherein the first frame further includes an information element indicative of supporting the communication operation in the second link.

10. The first device of claim 8, wherein the first frame comprises a probe request frame, an action frame, or a management frame.

11. The first device of claim 7, wherein the second frame includes system information of one or more STAs of the first device, and wherein each of the one or more STAs is an access point (AP) STA or a non-AP STA.

12. The first device of claim 7, wherein the second frame comprises a probe response frame or a beacon frame.

* * * * *